US008527013B2

(12) United States Patent
Guba et al.

(10) Patent No.: US 8,527,013 B2
(45) Date of Patent: Sep. 3, 2013

(54) SYSTEMS, METHODS, AND DEVICES FOR POLICY-BASED CONTROL AND MONITORING OF USE OF MOBILE DEVICES BY VEHICLE OPERATORS

(75) Inventors: Robert W. Guba, Baton Rouge, LA (US); Joseph E. Breaux, III, Baton Rouge, LA (US); Donald L. Powers, Baton Rouge, LA (US); Sean Brown, Curtis Bay, MD (US)

(73) Assignee: obdEdge, LLC, Baton Rouge, LA (US)

( * ) Notice: Subject to any disclaimer, the term of this patent is extended or adjusted under 35 U.S.C. 154(b) by 133 days.

(21) Appl. No.: 12/776,379

(22) Filed: May 8, 2010

(65) Prior Publication Data

US 2011/0009107 A1 Jan. 13, 2011

Related U.S. Application Data

(60) Provisional application No. 61/176,640, filed on May 8, 2009, provisional application No. 61/247,334, filed on Sep. 30, 2009, provisional application No. 61/301,902, filed on Feb. 5, 2010.

(51) Int. Cl.
*H04M 1/00* (2006.01)

(52) U.S. Cl.
USPC ........ 455/569.2; 455/41.2; 455/411; 455/418

(58) Field of Classification Search
USPC ................ 455/569.1, 569.2, 575.9, 418–420, 455/410–411, 41.2; 340/441, 466
See application file for complete search history.

(56) References Cited

U.S. PATENT DOCUMENTS

| 5,513,244 | A | 4/1996 | Joao |
| 5,797,134 | A | 8/1998 | McMillan et al. |
| 6,028,537 | A | 2/2000 | Suman et al. |
| 6,064,970 | A | 5/2000 | McMillan et al. |
| 6,496,703 | B1 | 12/2002 | da Silva |
| 6,591,168 | B2 | 7/2003 | Odinak et al. |
| 6,687,497 | B1 | 2/2004 | Parvulescu |
| 6,687,517 | B2 * | 2/2004 | Kinnunen ................ 455/569.1 |
| 6,690,940 | B1 | 2/2004 | Brown et al. |
| 6,771,946 | B1 | 8/2004 | Oyaski |

(Continued)

FOREIGN PATENT DOCUMENTS

| EP | 0955210 A2 | 11/1999 |
| EP | 1034980 A2 | 9/2000 |
| JP | 11-196475 A | 6/1999 |
| JP | 11-215562 A | 11/1999 |

*Primary Examiner* — Sharad Rampuria
(74) *Attorney, Agent, or Firm* — Todd Partners, P.C.; Jack D. Todd

(57) ABSTRACT

Systems, methods, and devices for controlling and limiting use of functions, such as calling, texting, chatting, emailing, Internet surfing, and similar applications, on a mobile device when the mobile device is in a moving vehicle, includes use of an on-board computer installed within the vehicle, a transmitter in electronic communication with the on-board computer that periodically transmits speed data of the vehicle to a receiver installed on the mobile device, wherein the mobile device includes suitable software and a rules-based policy that define and control when and which functions of the mobile device are disabled or interrupted by the software when the vehicle is in motion above a minimum threshold speed. Policies are set by default but may be customized for particular individuals, devices, or circumstances. Policies may also be customized for particular groups or subgroups of employees or contractors for company or legal compliance to reduce distracted driving.

43 Claims, 33 Drawing Sheets

(56) References Cited

U.S. PATENT DOCUMENTS

| | | |
|---|---|---|
| 6,816,760 B1 | 11/2004 | Namaky |
| 6,868,386 B1 | 3/2005 | Henderson et al. |
| 6,927,694 B1 | 8/2005 | Smith et al. |
| 6,973,136 B2 | 12/2005 | Kojima et al. |
| 7,031,660 B2 | 4/2006 | Vonheim et al. |
| 7,050,755 B2 | 5/2006 | Kline |
| 7,064,656 B2 | 6/2006 | Belcher et al. |
| 7,107,010 B2 * | 9/2006 | Heinonen et al. ............ 455/41.2 |
| 7,123,874 B1 | 10/2006 | Brennan |
| 7,181,229 B2 | 2/2007 | Singh et al. |
| 7,194,273 B2 | 3/2007 | Vaudreuil |
| 7,236,776 B2 * | 6/2007 | Nath et al. .................... 455/419 |
| 7,245,905 B2 | 7/2007 | Kamdar |
| 7,272,403 B2 | 9/2007 | Creamer |
| 7,343,148 B1 | 3/2008 | O'Neil |
| 7,349,722 B2 | 3/2008 | Witkowski et al. |
| 7,369,845 B2 | 5/2008 | Keohane |
| 7,477,135 B2 | 1/2009 | Belcher et al. |
| 7,477,891 B1 | 1/2009 | Pinault et al. |
| 7,551,994 B2 | 6/2009 | Odinak et al. |
| 7,640,101 B2 | 12/2009 | Pair et al. |
| 7,646,312 B2 | 1/2010 | Rosen |
| 7,650,140 B2 | 1/2010 | Plumb et al. |
| 7,650,170 B2 * | 1/2010 | May et al. .................. 455/569.2 |
| 7,689,253 B2 * | 3/2010 | Basir ............................ 455/563 |
| 7,738,831 B2 | 6/2010 | Nath et al. |
| 7,787,907 B2 | 8/2010 | Zeinstra et al. |
| 7,873,374 B1 * | 1/2011 | O'Neil ........................ 455/456.4 |
| 7,907,976 B2 * | 3/2011 | Himmelstein ............. 455/569.2 |
| 7,949,296 B2 | 5/2011 | Arend |
| 7,983,428 B2 * | 7/2011 | Ma et al. ....................... 381/94.7 |
| 7,983,840 B2 | 7/2011 | Pair et al. |
| 8,044,794 B2 | 10/2011 | Chauncey |
| 8,090,598 B2 | 1/2012 | Bauer et al. |
| 8,103,292 B2 | 1/2012 | Kelly et al. |
| 8,131,205 B2 | 3/2012 | Rosen |
| 8,140,358 B1 | 3/2012 | Ling et al. |
| 8,145,199 B2 * | 3/2012 | Tadayon et al. ............... 455/418 |
| 8,150,377 B2 | 4/2012 | Patterson et al. |
| 8,160,560 B2 * | 4/2012 | Geyer et al. .................... 455/418 |
| 8,190,089 B2 * | 5/2012 | Heo ............................ 455/41.2 |
| 8,200,291 B2 | 6/2012 | Steinmetz et al. |
| 8,258,919 B2 * | 9/2012 | Corradino et al. ........... 340/5.52 |
| 8,270,933 B2 | 9/2012 | Riemer |
| 8,280,438 B2 | 10/2012 | Barbera |
| 8,295,766 B2 * | 10/2012 | Zimbric et al. .............. 455/41.2 |
| 8,311,858 B2 | 11/2012 | Everett et al. |
| 2002/0070852 A1 | 6/2002 | Trauner et al. |
| 2004/0077339 A1 | 4/2004 | Martens |
| 2004/0203379 A1 | 10/2004 | Witkowski et al. |
| 2004/0215379 A1 | 10/2004 | Pangerl et al. |
| 2007/0072553 A1 | 3/2007 | Barbera |
| 2007/0270122 A1 | 11/2007 | Ewell |
| 2007/0296559 A1 | 12/2007 | Fehr |
| 2008/0009296 A1 | 1/2008 | Han |
| 2008/0015748 A1 | 1/2008 | Nagy |
| 2008/0027601 A1 | 1/2008 | Sewaki |
| 2008/0096613 A1 | 4/2008 | Karino |
| 2008/0221743 A1 | 9/2008 | Schwarz et al. |
| 2008/0305735 A1 | 12/2008 | Farnsworth et al. |
| 2008/0305780 A1 | 12/2008 | Williams et al. |
| 2009/0002147 A1 * | 1/2009 | Bloebaum et al. ............ 340/466 |
| 2009/0215466 A1 | 8/2009 | Ahl et al. |
| 2009/0312038 A1 | 12/2009 | Gildea |
| 2009/0318169 A1 | 12/2009 | Rogitz |
| 2010/0009626 A1 | 1/2010 | Farley |
| 2010/0035632 A1 | 2/2010 | Catten |
| 2010/0130182 A1 | 5/2010 | Rosen |
| 2010/0210254 A1 | 8/2010 | Kelly et al. |
| 2010/0216509 A1 * | 8/2010 | Riemer et al. ................. 455/557 |
| 2010/0268402 A1 | 10/2010 | Schwarz et al. |
| 2011/0065456 A1 | 3/2011 | Brennan et al. |
| 2012/0040650 A1 | 2/2012 | Rosen |
| 2012/0239223 A1 | 9/2012 | Schwarz et al. |
| 2012/0252350 A1 | 10/2012 | Steinmetz et al. |

* cited by examiner

CUSTOMER ACTIVATION
THIS IS YOUR USER NAME AND PASSWORD SAVE

USER NAME*
PASSWORD*
PASSWORD*
ADDRESS:
CITY:
STATE:
ZIP:
TARGET PHONE:
PRIMARY EMAIL*
SERVICE PLAN* ○ 2 YEAR PRE-PAID "CELLCONTROL" BASIC PLAN $xxxx (15% PLAN SAVINGS)
○ 1 YEAR PRE-PAID "CELLCONTROL" BASIC PLAN $xxxx (10% PLAN SAVINGS)
● MONTHLY "CELLCONTROL" BASIC PLAN $xxxx (1 MONTH & ACTIVATION) + $xxx PER MONTH (SUBMIT) (RESET)

FIG. 13

SYSTEM REMOTE MANAGEMENT CONSOLE LOGIN

LOGIN

USER NAME*

PASSWORD*

LOG IN

FORGOT PASSWORD ?

| DASHBOARD SUPPORT | |
|---|---|
| HOME  ACCOUNT SETTINGS  MY ALLOWED NUMBERS | |

MY POLICY

| POLICY DETAILS | STATUS |
|---|---|
| BLOCK PHONE CALLS | ☑ |
| BLOCK TEXT MESSAGING | ☑ |
| BLOCK EMAILS | ☑ |
| ALLOWED OVERRIDES PER DAY | m |
| ALLOWED PERSONAL NUMBERS | n |
| LOG SPEED DETAILS ? | ☐ |
| VIOLATION EMAIL ADDRESS | ROB@MAYEMAIL.COM |
| SEND VIOLATION TEXT | ☑ |
| BLOCKING MODE WINDOW TEXT | |
| ALLOW SHOW MESSAGING SCREEN | ☐ |
| ALLOW SHOW NAVIGATOR SCREEN\ | ☐ |
| ALLOW SHOW GOOGLE MAPS SCREEN | ☑ |
| ALLOW SHOW MUSIC APPS | ☑ |
| BATTERY SAVING MODE | LOW |

SAVE

FIG. 17

| DASHBOARD SUPPORT | |
|---|---|
| HOME  ACCOUNT SETTINGS  MY ALLOWED NUMBERS | |

SETTINGS: user1980
EDIT

| USER DETAILS | VALUE |
|---|---|
| PASSWORD* | ************************ |
| PASSWORD* | ************************ |
| ADDRESS | 123 STREET |
| CITY | BATON ROUGWE |
| STATE | LA |
| ZIP | 70806 |
| FIRST NAME | |
| LAST NAME | |
| EMAIL | ROB@MYEMAIL.COM |
| | SUBMIT   RESET |

DASHBOARD SITES USERS GROUPS DEVICES PHONES POLICIES SUPPORT MANAGE ACCOUNT VISIT CORPORATE SITE

OVERVIEW ADD GROUP

WELCOME JOBO_ADMIN (RETURN TO ADMIN) [LOGOUT] SETTINGS / HELP
LAST LOGGED IN AT 2009-09-29 10:39:21

SEARCH [GO]

GROUPS MANAGEMENT
MANAGE YOUR GROUPS

| GROUP NAME | CREATED | SHARE CODE | POLICIES | ACTIONS |
|---|---|---|---|---|
| Samson1 | 2009-07-29 22:30:10 | m6r8xwc379 | 1 | [VIEW] [EDIT] |

FIND GROUP [SEARCH] [GO]

RECENT ACTIVITY
ACTIVE USERS (4)
ACTIVE PHONES (6)
ACTIVE DEVICES (6)
OF GROUPS (1)
OF POLICIES (1)

RECENT NEWS
MBTA CONDUCTOR IN BOSTON TROLLEY CRASH WAS TEXTING HIS GIRLFRIEND
SAYING HE WAS HAVING DIFFICULTY CONTACTING HIS OUTRAGE, THE MBTA'S CHIEF SAID A TROLLEY DRIVER WAS TEXT MESSAGING FROM HIS CELLPHONE WHEN HE REAR-ENDED ANOTHER GREEN LINE TROLLEY ON FRIDAY NIGHT, SENDING SCORES OF PEOPLE TO THE HOSPITAL AND FORCING THE CLOSURE OF THE GOVERNMENT CENTER STATION.

FIG. 32

SYSTEMS, METHODS, AND DEVICES FOR POLICY-BASED CONTROL AND MONITORING OF USE OF MOBILE DEVICES BY VEHICLE OPERATORS

CROSS REFERENCE TO RELATED APPLICATIONS

This application claims the benefit under 35 U.S.C. §119(e) of U.S. Provisional Patent Application No. 61/176,640, entitled "System for Policy-Based Mobile Communications in Vehicles," filed May 8, 2009, and U.S. Provisional Patent Application No. 61/247,334, entitled "Improved System for Policy-Based Mobile Communications in Vehicles," filed Sep. 30, 2009, and U.S. Provisional Patent Application No. 61/301,902, entitled "Further Improved System for Policy-Based Mobile Communications in Vehicles," filed Feb. 5, 2010, all three of which are incorporated herein by reference, in their entirety. This application is also related to and incorporates herein by reference and in its entirety, PCT/US2010/034151 application, which is filed contemporaneously herewith.

FIELD OF THE PRESENT INVENTION

The systems, methods, and devices described herein relate generally to use of mobile computing and communication devices in vehicles, and, more particularly, to systems, methods, and devices that use data provided by or obtained from the vehicle in conjunction with policy-based protocols or rules for selectively controlling, limiting, managing, monitoring, and auditing use and communications to and from such mobile devices while in the vehicle and for detecting, monitoring, and reporting on other vehicle usage using the mobile device.

BACKGROUND OF THE PRESENT INVENTION

Use of mobile computing and communication devices in vehicles is a hotly debated topic. While such use provides convenience and potentially enhances worker productivity, it has also been shown that such use has a detrimental effect and impact on the driver/operator's (hereinafter referred to, for convenience, as the "driver") ability to focus on driving or otherwise operating the vehicle—with some studies indicating that distracted driving may be even more dangerous than driving while intoxicated or under the influence of drugs. Numerous accidents by drivers of automobiles, trucks, motorcycles, buses, planes, helicopters, blimps, balloons, gliders, boats, ferries, trains, trams, heavy equipment or machinery, and similar devices or machines (collectively and hereinafter referred to as "a vehicle" or "vehicles" for convenience) have been attributed to driver inattentiveness or distraction while talking, texting, surfing, browsing, or otherwise interacting with or using a mobile computing or communication device rather than focusing full attention on driving or operating the vehicle. The term "vehicle" is further intended to include any type of device or machine that is driven, operated, or controlled by a user (i.e., driver) and that is susceptible to accident or injury to self or others if the driver is careless or not paying full attention to operation of the vehicle.

Numerous cities, counties, states, and even the Federal government have imposed or are considering imposing legal restrictions on use of (or that imposed increased sanctions for accidents that occur due to use of) such mobile devices by a driver of a vehicle. As the functionality of such mobile computing and communication devices continues to increase and expand, the potential distractions posed by such mobile devices on vehicle drivers is likely to increase even more—leading to further accidents, higher risks to drivers, passengers, and any third parties near such vehicles, higher insurance rates, and more litigation.

As used herein, "mobile devices" are intended to include and encompass any type of hand-held or mobile device or other computing or communication device usable within a vehicle, such as but not limited to cell phones, smart phones, push-to-talk devices, PDAs, text or email dedicated devices, general computers, laptops, electronic reading devices, multimedia equipment, data tablets, and similar computing or communication device that would or could be used by or accessible to the driver of a vehicle while it is moving or otherwise in operation.

Although laws may be passed, company policies may be adopted, and insurance policies may be tailored to provide lower insurance rates for drivers who do not use their mobile device while operating a vehicle or to provide less or no coverage for drivers who are involved in accidents because of distraction from confirmed use of such a mobile device during an accident, the options and ability for physically or technologically controlling, managing, limiting, monitoring, and auditing use of and communications to and from such mobile devices, particularly in real time and based on other factors and variables (such as whether the vehicle is on and/or moving, how fast it is moving, what time of day it is, what day of the week it is, where the vehicle is located, and the like) has been limited, to date.

For all of these reasons, there are needs in the industry for systems, methods, and devices, that use computer-implemented, configurable policies to control, manage, limit, monitor, and/or audit use of and communications to and from mobile devices used in or by drivers of vehicles. Advantageously, data provided by or obtained from the vehicle, such as from a vehicle's on board computer or similar vehicle components or systems, alone or in conjunction with other available external data or information (such as GPS location data, time of day, day of week, type of activity or communication attempted on the mobile device, and the like) is usable to enable a default or configurable, policy-based software application, preferably installed on or interactive with such mobile devices, which defines rules and protocols selectively to control or limit use of the functionality of such mobile devices. Such systems can also be used advantageously to monitor, audit, and record use of mobile devices in vehicles, even if actual use is not limited, controlled, or prevented by the system or policy. In addition, such systems can be configured to capture relevant data and information about the vehicle when the mobile device is in or in close proximity to the vehicle—even if use of the mobile device is not limited, controlled, or prevented by the system or the policy. Further, such technology can be used advantageously to detect, monitor, and report on vehicle usage patterns, including period of excessive speeding or idle time.

There are needs for such controls and limits not only in consumer markets (e.g., for parents who want to limit or control use of a mobile device by their teen driver while the teen driver is driving the family car) but also in commercial or governmental applications (e.g., a company with a fleet of delivery trucks may need to ensure (for insurance, company policy, political, court settlement, or public relations reasons) that all of their designated employees are not engaged in personal calls, texting, surfing, or use of non-business software application while driving a company vehicle during work hours; or a municipality, county, state, or government agency may need to prevent their conductors or drivers from similar personal activities on mobile devices while operating a commuter train, tram, bus, or other public vehicle while they are on the job.

The above needs and features, as well as additional aspects and business applications, are disclosed herein and will become readily apparent to one of ordinary skill in the art after reading and studying the following summary of the present inventions, the detailed description of preferred embodiments, and the claims included hereinafter.

SUMMARY OF THE PRESENT INVENTION

The present invention relates generally to use of mobile computing and communication devices in vehicles, and, more particularly, to systems, methods, and devices that use data provided by or obtained from the vehicle in conjunction with policy-based protocols or rules for selectively controlling, limiting, managing, monitoring, and auditing use and communications to and from such mobile devices while in the vehicle and for detecting, monitoring, and reporting on other vehicle usage by means of the mobile device.

Briefly described, aspects of the present invention include the following.

In a first aspect, a system for controlling use of functions on a mobile device when the mobile device is in a vehicle, comprises a vehicular on-board computer installed within the vehicle and configured to obtain speed data from the vehicle, a transmitter in electronic communication with the on-board computer and configured to transmit an indication of the speed data on a periodic basis, a receiver installed on the mobile device adapted to receive the indication of speed data transmissions from the transmitter, a software application installed on the mobile device, wherein the software application runs in memory resident on the mobile device whenever the mobile device is powered on and wherein the software application receives the indication of speed data from the receiver, the software application including a policy associated therewith that defines when and which functions of the mobile device are disabled by the software application in response to the indication of speed data transmission, whereby, in response to receipt of the indication of speed transmission data, if the vehicle speed exceeds a minimum threshold speed level, the software application disables the functions of the mobile device in accordance with the policy associated therewith.

In a feature, the vehicular on-board computer obtains the speed data from the vehicle continuously or on a periodic or predefined basis.

In another feature, the functions of the mobile device remain disabled for a predetermined period of time after the indication of speed transmission data indicates that the vehicle speed exceeds the minimum threshold speed level. Preferably, this predetermined period of time in which the functions of the mobile device remain disabled is set by default or may be modified by a customized policy.

In yet a further feature, the functions of the mobile device are enabled after the indication of speed transmission data indicates that the vehicle speed has been below the minimum threshold speed level for a predetermined period of time. Again, the predetermined period of time in which the indication of speed transmission data indicates that the vehicle speed has been below the minimum threshold speed is set by default or may be modified by a customized policy.

In further features, the transmitter transmits the indication of the speed data continuously or on a periodic basis.

As used herein, a vehicle may include an automobile, truck, motorcycle, bus, aircraft, watercraft, plane, helicopter, blimp, hot air balloon, glider, boat, ferry, train, tram, heavy equipment or machinery, or any similar devices operated by a person.

As also used herein, a mobile device includes a cell phone, smart phone, push-to-talk device, PDA, text or email dedicated device, general computer, laptop, electronic reading device, multimedia equipment, data tablet, or any similar computing or communication device—each having a display or interface that is usable by or accessible to a driver of the vehicle.

Functions of a mobile device that may be blocked or interrupted include one or more of: making an outgoing call, receiving an incoming call, sending or receiving a text message, text chatting, push-to-talk, sending or receiving an email, Internet browsing, and launching of an application installed on the mobile device.

Preferably, speed includes relative speed of the vehicle whether the vehicle is moving in the forward or reverse direction.

In one embodiment, the transmitter is built into and integrated with the on-board computer. In another embodiment, the transmitter is included in an on-board diagnostic (OBD) device that plugs into the OBD port of the vehicle, wherein the OBD port is in electronic communication with the on-board computer. The OBD device preferably receives power from the vehicle through the OBD port, directly from a wired connection with the battery of the vehicle, and/or independently from the power supply of the vehicle.

Preferably, the OBD device transmits to the mobile device an indication that the OBD device has lost power whenever it has been unplugged from the OBD port or an indication that the OBD device has lost power whenever there has been a power interruption to the OBD device.

In another feature, the transmitter and receiver communicate through a wireless communication protocol. Such wireless communication protocol include an RF communication protocol, a WiFi or Zigby communication protocol, or a Bluetooth communication protocol. In one embodiment, the transmitter and receiver are paired using the Bluetooth protocol. In another embodiment, the transmitter broadcasts speed data without pairing with the receiver. In such embodiment, numerous mobile devices are able to receive the transmitter broadcast because there is no specific Bluetooth pairing.

In yet a further feature, the receiver searches for the electronic communication from the transmitter on a periodic basis.

In a further feature, the transmitter and receiver communicate through a wired connection between a data port of the vehicle and a data port of the mobile device.

In another feature, the indication of the speed data includes the actual speed of the vehicle. Preferably, the policy defines the speed of the threshold speed level In another feature, the indication of the speed data includes a flag indicating that the speed of the vehicle is currently above the threshold speed level. Alternatively, the indication of the speed data includes the actual speed of the vehicle and the policy defines the threshold speed level.

In another feature, the transmitter only transmits the indication of the speed data when the vehicle is on.

In various features, the policy prevents outgoing calls from the mobile device, prevents the mobile device from accessing the phone functions on the mobile device, disables the display screen of the mobile device, causes the software application to display a system screen on the display screen of the mobile device when the vehicle speed exceeds the minimum threshold speed level, immediately interrupts and disables the functions of the mobile device when the vehicle speed exceeds the minimum threshold speed level, is associated with the vehicle, is associated with the mobile device, is only effective during predefined days of the week and hours of the day, has a plurality of rules that vary as a function of predefined days of the week and hours of the day, includes a plurality of rules that vary based upon the GPS-determined location of the mobile device, defines a PIN or password that can be entered into the mobile device to enable all functions of the mobile device even if the vehicle is in motion, defines a PIN or password that can be entered into the mobile device to enable predefined functions of the mobile device even if the vehicle is in motion, prevents incoming calls from being received by the mobile device, allows incoming calls to be received by the mobile device, but prevents any indication of the incoming call from being detected by or notified to a user of the mobile device until a later period of time, routes incoming calls directly to voice mail, prevents incoming and outgoing text messages, disables the mobile device completely, identifies specific numbers or contacts from which the mobile device can receive communications on an incoming basis even when the vehicle is in motion, identifies specific numbers or contacts to which the mobile device is permitted to communicate on an outgoing basis even when the vehicle is in motion, and identifies specific applications that are usable and launchable by the mobile device even when the vehicle is in motion.

In another feature, the software application has a default policy that is associated with the software application when the software application is installed on the mobile device. Alternatively, the policy is customizable by an account administrator and may be distributed to a plurality of mobile devices, distributed to all employees of an organization, distributed to a subset of employees of an organization. Such organization may include a company or a governmental entity.

In one embodiment, the account administrator is an adult and the user of the mobile device is a dependent of the adult.

In another feature, insurance costs are reduced for an owner of the vehicle if the vehicle has the transmitter installed therein and if the software application is installed on the mobile device of one or more drivers of the vehicle.

In another feature, the mobile device first queries the transmitter to obtain a device name for the transmitter, after which the indication of speed data transmissions from the transmitter are receivable by the receiver of the mobile device.

In yet another feature, the transmitter is configured to transmit and the receiver is configured to receive additional data obtained from the on-board computer. Such additional data includes an indication of whether the vehicle is turned on or off, includes an indication of what gear the vehicle is in, includes a device name for the transmitter. In some embodiments, the indication of speed data is included as a variable in the device name transmitted by the transmitter.

In yet another feature, the policy is updated on the mobile device by means of a text message sent to the mobile device, or when the mobile device is connected to the Internet, or when the mobile device is synched with software installed on a computer of the user of the mobile device.

In another aspect, a computer program residing in computer-readable memory on a mobile device, wherein the mobile device includes a receiver, and further includes conventional firmware and hardware that enables the mobile device to engage in electronic communications and to perform other functions, the computer program comprises instructions that, when processed on a computer within the mobile device, causes the computer to (i) whenever the mobile device is powered on, launch the computer program and maintain the computer program as an application running in the background of the mobile device, (ii) periodically check, using the receiver, for a data signal transmission containing a transmitter identifier and an indication of speed data from a vehicle in proximity to the mobile device, (iii) store a policy within memory on the mobile device, wherein the policy defines when and which functions of the mobile device will be disabled based on the indication of speed data obtained from the data signal transmission, (iv) if an approved transmitter is identified by the transmitter identifier, extract and store the indication of speed data in memory on the mobile device, and (v) if the speed data indicates that the vehicle has exceeded a minimum threshold speed level, disabling selected functions of the mobile device according to the stored policy.

In a feature, the approved transmitter is in electronic communication with an on-board computer of the vehicle.

In another feature, the receiver checks for the data signal transmission on a first periodic basis until a first transmission is received and, thereafter, checks on a second, more frequent periodic basis thereafter. Preferably, the receiver resumes checking for the data signal transmission on the first periodic basis after a predetermined period of time in which no data signal transmissions are received from the vehicle.

In another feature, the functions of the mobile device remain disabled for a predetermined period of time after the indication of speed transmission data indicates that the vehicle speed exceeds the minimum threshold speed level. Preferably, the predetermined period of time in which the functions of the mobile device remain disabled is set according to the policy.

In yet a further feature, the functions of the mobile device are enabled after the indication of speed transmission data indicates that the vehicle speed has been below the minimum threshold speed level for a predetermined period of time. Preferably, the predetermined period of time in which the indication of speed transmission data indicates that the vehicle speed has been below the minimum threshold speed is set according to the policy.

In a feature, the functions of the mobile device are enabled after there are no data signal transmissions received by the receiver for a predetermined period of time.

In another feature, the mobile device includes one of a cell phone, smart phone, push-to-talk device, PDA, text or email dedicated device, general computer, laptop, electronic reading device, multimedia equipment, data tablet, and similar computing or communication device each having a display or interface that is usable by or accessible to a driver of the vehicle.

Preferably, functions on the mobile device include one or more of making an outgoing call, receiving an incoming call, push-to-talk, sending or receiving a text message, text chatting, sending or receiving an email, Internet browsing, and launching of a specified application installed on the mobile device.

In another feature, the indication of speed data identifies relative speed of the vehicle whether the vehicle is moving in the forward or reverse direction.

Preferably, the data transmission signal is configured to include an indication that the transmitter has been disabled and/or an indication that the transmitter has experienced a power interruption.

In another feature, the transmitter and receiver communicate through a wireless communication protocol. Such wireless communication protocol include an RF communication protocol, a WiFi or Zigby communication protocol, or a Bluetooth communication protocol. In one embodiment, the transmitter and receiver are paired using the Bluetooth protocol. In another embodiment, the transmitter broadcasts speed data without pairing with the receiver. In such embodiment, numerous mobile devices are able to receive the transmitter broadcast because there is no specific Bluetooth pairing.

In another feature, the transmitter and receiver communicate through a wired connection between a data port of the vehicle and a data port of the mobile device.

In yet a further feature, the indication of the speed data includes the actual speed of the vehicle and, preferably, the policy defines the threshold speed level In a feature, the indication of the speed data includes a flag indicating that the speed of the vehicle is currently above the threshold speed level. Alternatively, the indication of the speed data includes the actual speed of the vehicle and the policy defines the threshold speed level.

In various features, the policy prevents outgoing calls from the mobile device, prevents the mobile device from accessing the phone functions on the mobile device, disables the display screen of the mobile device, causes the software application to display a system screen on the display screen of the mobile device when the vehicle speed exceeds the minimum threshold speed level, immediately interrupts and disables the functions of the mobile device when the vehicle speed exceeds the minimum threshold speed level, is associated with the vehicle, is associated with the mobile device, is only effective during predefined days of the week and hours of the day, has a plurality of rules that vary as a function of predefined days of the week and hours of the day, includes a plurality of rules that vary based upon the GPS-determined location of the mobile device, defines a PIN or password that can be entered into the mobile device to enable all functions of the mobile device even if the vehicle is in motion, defines a PIN or password that can be entered into the mobile device to enable predefined functions of the mobile device even if the vehicle is in motion, prevents incoming calls from being received by the mobile device, allows incoming calls to be received by the mobile device, but prevents any indication of the incoming call from being detected by or notified to a user of the mobile device until a later period of time, routes incoming calls directly to voice mail, prevents incoming and outgoing text messages, disables the mobile device completely, identifies specific numbers or contacts from which the mobile device can receive communications on an incoming basis even when the vehicle is in motion, identifies specific numbers or contacts to which the mobile device is permitted to communicate on an outgoing basis even when the vehicle is in motion, and identifies specific applications that are usable and launchable by the mobile device even when the vehicle is in motion.

In another feature, the policy stored within memory on the mobile device is a default policy that is installed when the computer program is installed on the mobile device. Additionally or alternatively, the policy is customizable by an account administrator and may be distributed to a plurality of mobile devices, distributed to all employees of an organization, distributed to a subset of employees of an organization. Preferably, the organization is a company or a governmental entity.

In yet a further feature, the account administrator is an adult and the user of the mobile device is a dependent of the adult.

Preferably, insurance costs are reduced for an owner of the vehicle if the vehicle has the transmitter installed therein and if the computer program is installed on the mobile device of one or more drivers of the vehicle.

In another feature, the computer program first queries the transmitter to obtain the transmitter identifier, after which the indication of speed data transmissions from the transmitter are receivable by the receiver of the mobile device.

In yet a further feature, the transmitter is configured to transmit and the receiver is configured to receive additional data obtained from the on-board computer. Such additional data may include an indication of whether the vehicle is turned on or off, an indication of what gear the vehicle is in, and/or a device name for the transmitter. Preferably, the indication of speed data is included as a variable in the device name transmitted by the transmitter.

In another feature, the policy is updated on the mobile device by means of a text message sent to the mobile device, when the mobile device is connected to the Internet, and/or when the mobile device is synched with software installed on a computer of the user of the mobile device.

The present invention also encompasses computer-readable medium having computer-executable instructions for performing methods of the present invention, and computer networks and other systems that implement the methods of the present invention. The present invention also may include one or more computer programs residing on computer-readable media or in computer-readable memory wherein the program(s) include computer-executable instructions that, when processed by the computer, cause the computer to performs selected steps and elements of methods described herein.

The above features as well as additional features and aspects of the present invention are disclosed herein and will become apparent from the following description of preferred embodiments of the present invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein:

FIGS. 13-32 illustrate various screen shots from an Internet management console used within the systems described herein.

DETAILED DESCRIPTION OF PREFERRED EMBODIMENTS

Figure 1A:
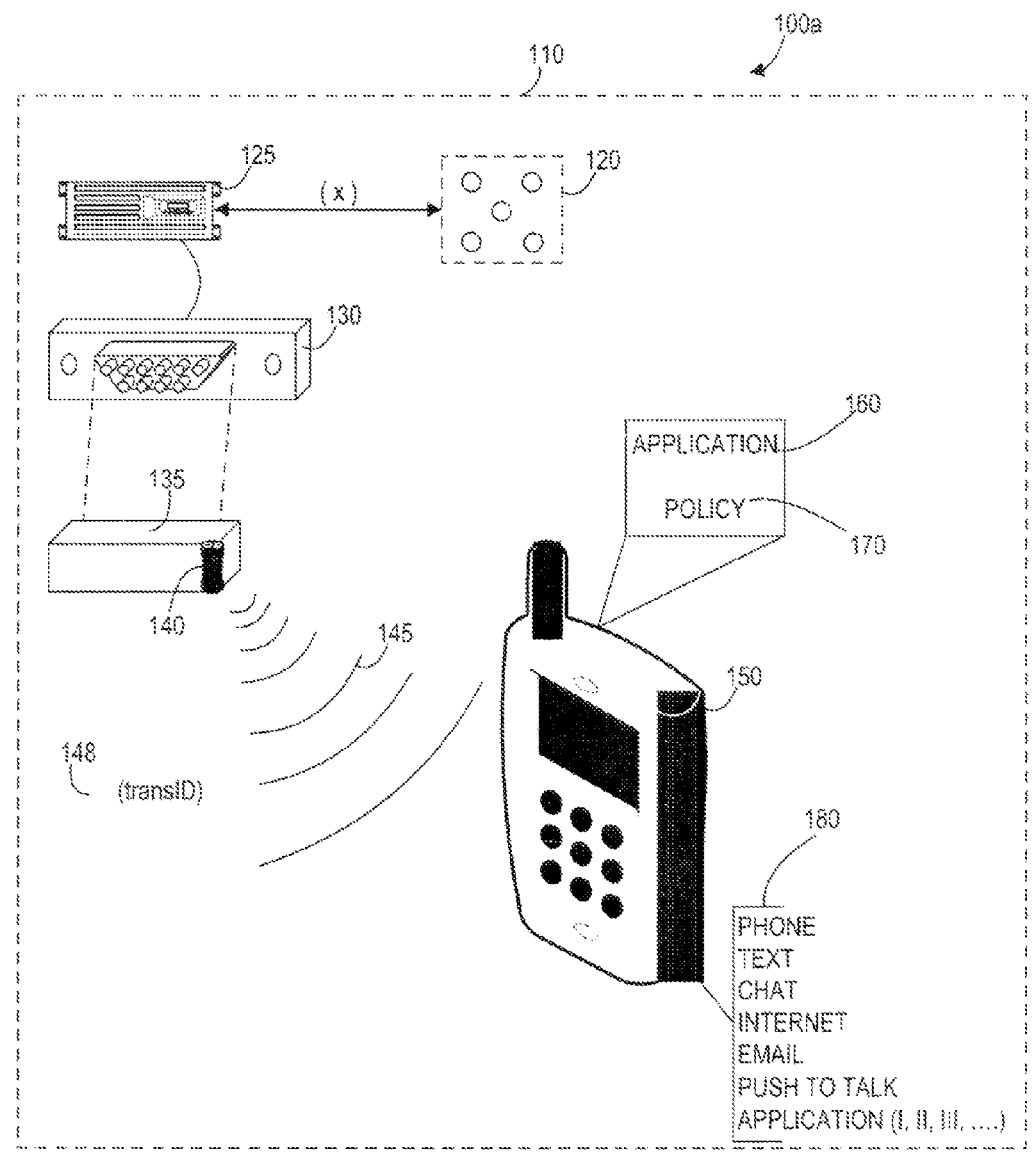
FIG. 1A is a system view of one embodiment of the present invention.

Preferably, the exemplary systems, devices, and methods described herein are designed to improve upon the safe operation of a vehicle by a driver who has a mobile device, by limiting, controlling, managing, or preventing use of some or all functionality of the mobile device while the vehicle is in operation by the driver and/or in motion above a threshold speed, whether in reverse or forward direction. Preferably, a default or configurable policy, rule base, or set of protocols are installed on, uploaded to, or otherwise accessible by the mobile device to define what functionality of the mobile device is limited, controlled, managed, or prevented and under what circumstances. Advantageously, the systems, methods, and devices described herein are also capable of monitoring usage of a vehicle to detect, log, and report on dangerous or abusive operator behavior, such as excessive speeding or excessive idling of the vehicle.

As stated previously, the term "mobile device" is intended to include and encompass, but not be limited to, any type of hand-held, mobile, or other computing or communication device usable within a vehicle, such as but not limited to cell phones, smart phones, push-to-talk devices, PDAs, text or email dedicated devices, general computers, laptops, electronic reading devices, multimedia equipment, data tablets, and similar computing or communication device that would or could be used by or accessible to the driver of a vehicle while it is moving or otherwise in operation and that could contribute to driver inattentiveness or distraction because of the talking, texting, surfing, or browsing functions of the mobile device, which can interfere with the driver's ability to focus full attention on driving or operating the vehicle.

Also, as stated previously, the term "vehicle" is intended to include any type of device or machine that is driven, operated, or controlled by a user (i.e., driver) and that is susceptible to or capable of causing an accident or injury to self or others if the driver is careless or not paying full attention to operation of the vehicle, and includes and encompasses, but is not be limited to, automobiles, trucks, motorcycles, buses, planes, helicopters, blimps, balloons, gliders, boats, ferries, trains, trams, heavy equipment or machinery, and similar devices or machines (collectively and hereinafter referred to as "a vehicle" or "vehicles" for convenience).

Additional features, as described herein or as will be readily apparent to one of ordinary skill in the art, expand upon the capabilities of the core systems, methods, and devices described herein and are intended to improve the safe operation, manageability, portability, enforcement, and support of use of mobile devices by drivers of vehicles. Additional aspects and business applications, are disclosed herein and will also become readily apparent to one of ordinary skill is in the art after reading and studying the summary of the present inventions, this detailed description of preferred embodiments, and the claims included hereinafter.

The systems, methods, and devices described herein enable mobile communication policy management and enforcement on mobile devices and in vehicles that are defined and enabled for use within the system. Such policies may be targeted to individual users, devices, and vehicles, or they may be targeted to fleets of vehicles and selectively to groups or subgroups of employees or other categories of people using a centralized policy distribution and management system. Preferably, there are one or more "default" or pre-defined policies usable and pre-configured for individual or corporate users and for different types of mobile devices—based on the capabilities and functionality of such mobile devices and based on the typical functions of the mobile device that are prevented, based on when such functionality needs to be prevented, and based on what functionality should not be prevented or is selectively permitted (such as the ability to make an emergency phone call, access a GPS map application, and the ability to text or call to or from specific numbers or people included on a "white" list or permitted list). In addition, some companies may want to allow some of their corporate software applications to be accessible to their employee drivers even while operating a vehicle, as part of their job. As will also be described in greater detail hereinafter, the system allows an administrator to define customized policies for individuals or for larger groups of people (e.g. all family members, all kids in the family, employees of a division, specific types of employees, or all employees of the company, and the like). In a preferred embodiment, mobile devices and/or vehicles that are not integrated into the system or that do not have suitable system software application(s) installed on the mobile device will not be impacted or interfered with by the system.

Preferably, the system components, devices, and methods—from installation, to defining and implementation of policies, and to ongoing management and control of mobile devices used in vehicles is designed as a simple solution to self-install, setup, and run without the need for outside vendor assistance. Preferably, the system is usable by any mobile device users in the United States or internationally with vehicles that support the OBD standard, such as OBD-II (in the US from 1996 to current and as expected to continue, albeit in updated versions, in future automotive vehicles) or in any vehicle that has been configured (at the factory or in an after-market installation) to include suitable sensors, components, and communication devices/data transmitters to provide data similar to OBD data (such as current vehicle speed) without use of a conventional OBD port.

In one preferred embodiment, the system accesses an existing OBD port on a vehicle wherein the OBD port is connected to and obtains data from the vehicle's on-board computer and/or from mechanical systems and sensors within the vehicle. In alternative embodiments, such data may be obtained directly, such as through a wired data communication line or in a wireless communication, from such on-board computers or mechanical systems without the use of, benefit from, or need for an OBD port. Preferably, such data, whether obtained through the OBD port or otherwise, includes status information regarding the vehicle, such as but not limited to whether the vehicle is in motion, whether the vehicle is turned "on," what gear the vehicle is in, how fast the vehicle is currently going (in reverse or forward direction) at any point in time, or the maximum speed the vehicle has gone in the last x (e.g., 15 seconds) period of time.

It should also be understood that, although use of and description of OBD ports and data are described herein, the present system is also usable with other data interfaces that provide vehicle state or status information—now developed or adopted in the future. For example, the present system is also usable with other vehicle diagnostic protocols, such as OBD-I, OBD-1.5, EOBD (European On-Board Diagnostics), EOBD2 (enhanced version of EOBD), JOBD (Japanese On-Board Diagnostics), SAE J1939 (On-Board Diagnostic protocols used in the US for heavy duty trucks, commercial vehicles, and similar equipment), and any other similar diagnostic or communication protocols now in use or developed hereinafter that provide vehicle state or status information in accessible data format.

The system is also preferably designed to be expandable to support complex environments with large numbers of mobile devices and large numbers of vehicles—in one to one, one to many, many to one, or many to many configurations between vehicles and mobile devices, as will be explained in greater detail hereinafter.

Turning now to FIG. 1A, a high level overview of one preferred embodiment of the system 100a is illustrated. The system 100a is designed to be used in a vehicle 110. As stated previously, vehicle 110 is intended to include any type of device or machine that is driven, operated, or controlled by a user (i.e., driver) and that is susceptible to accident or injury to self or others if the driver is careless or not paying full attention to operation of the vehicle. Although automobiles are the most typical type of vehicle with which the system will be used, the system is also usable and adaptable for use with many other types of vehicles including, but not limited to, trucks, motorcycles, buses, planes, helicopters, blimps, balloons, gliders, boats, ferries, trains, trams, heavy equipment or machinery, and similar devices or machines. For the present discussion, the vehicle 110 is shown only in the abstract by a dashed line. Most vehicles 110 include mechanical, electrical, and software sensors, shown in the abstract by box 120, that identify the state or status of the vehicle or of specific components or subsystems of the vehicle, such as fluid levels, tire pressure, whether the vehicle is on or off, what gear the vehicle is in, its current speed, mileage, pressure gauges, etc., as will be appreciated by those of ordinary skill in the art. Sensors 120 are preferably in electronic communication with a vehicular on-board computer 125. Data communication between the on-board computer 125 and sensors 120 may be either one way or two way (i.e., bidirectional); however, for most purposes disclosed herein, data (x) provided by the sensors 120 to the on-board computer 125 will be of most relevance. In this embodiment, on board computer 125 is also in electronic communication with an On-Board Diagnostics (OBD) interface or port 130 (typically accessible under or at the bottom of the dashboard of a typical automobile). In this first preferred embodiment, an OBD device 135 is adapted to plug into the OBD port 130. The OBD device 135 preferably includes a built-in transmitter 140. The location and configuration of the transmitter 140 on the OBD device 135 is typically not important, as long as the transmitter 140 is adapted to and capable of transmitting data using wireless, RF, infrared, WiFi, Bluetooth, Zigby, or similar communication protocols to mobile devices 150 within the vehicle 110. The transmission signal 145 preferably includes a specific data transmission 148. The specific data transmission 148 preferably includes a transmitter identifier (transID) associated with or representative of the transmitter 140 and current speed data (v) associated with the vehicle 110, which was preferably obtained by the on-board computer 125 from the data (x) provided from the vehicle sensors 120. Additional data may also be transmitted and used to advantage within the system, as described hereinafter.

The system 100a also includes and is intended to be used with a mobile device 150 that is used by a driver (not shown) of the vehicle 110. As stated previously, a mobile device 150 is intended to include and encompass, but not be limited to, any type of hand-held or mobile computing or communication device usable within a vehicle, such as but not limited to cell phones, smart phones, push-to-talk devices, PDAs, text or email dedicated devices, general computers, laptops, electronic reading devices, multimedia equipment, data tablets, and similar computing or communication device that would or could be used by or accessible to the driver of a vehicle while it is moving or otherwise in operation. Preferably the mobile device 150 includes a receiver or antenna (not shown) that is typically built into, or in electronic communication with, the mobile device 150. The mobile device 150 also has suitable system software or firmware 160 installed thereon, as will be described herein. Additionally, the mobile device 150 also includes a system "policy" 170, that is either set by default or programmed/customized specifically for that mobile device or user of the mobile device. As will be explained hereinafter, the policy 170 is used to determine what functions 180 of the mobile device 150 will be permitted (and when) and which ones will be prohibited or interrupted, when the mobile device 150 is being used in a vehicle 150 that is moving above a threshold speed. The mobile device 150 typically has one or more of the following capabilities or functions 180, such as the ability to place or receive a call, the ability to send or receive a text message, the ability to engage in a real-time chat/textual communication, the ability to access the Internet or web browser, the ability to send or receive an email, the ability to engage in a "push-to-talk" communication, and the ability to launch, use, and access other software applications that are built into or installed thereon.

Figure 1B:
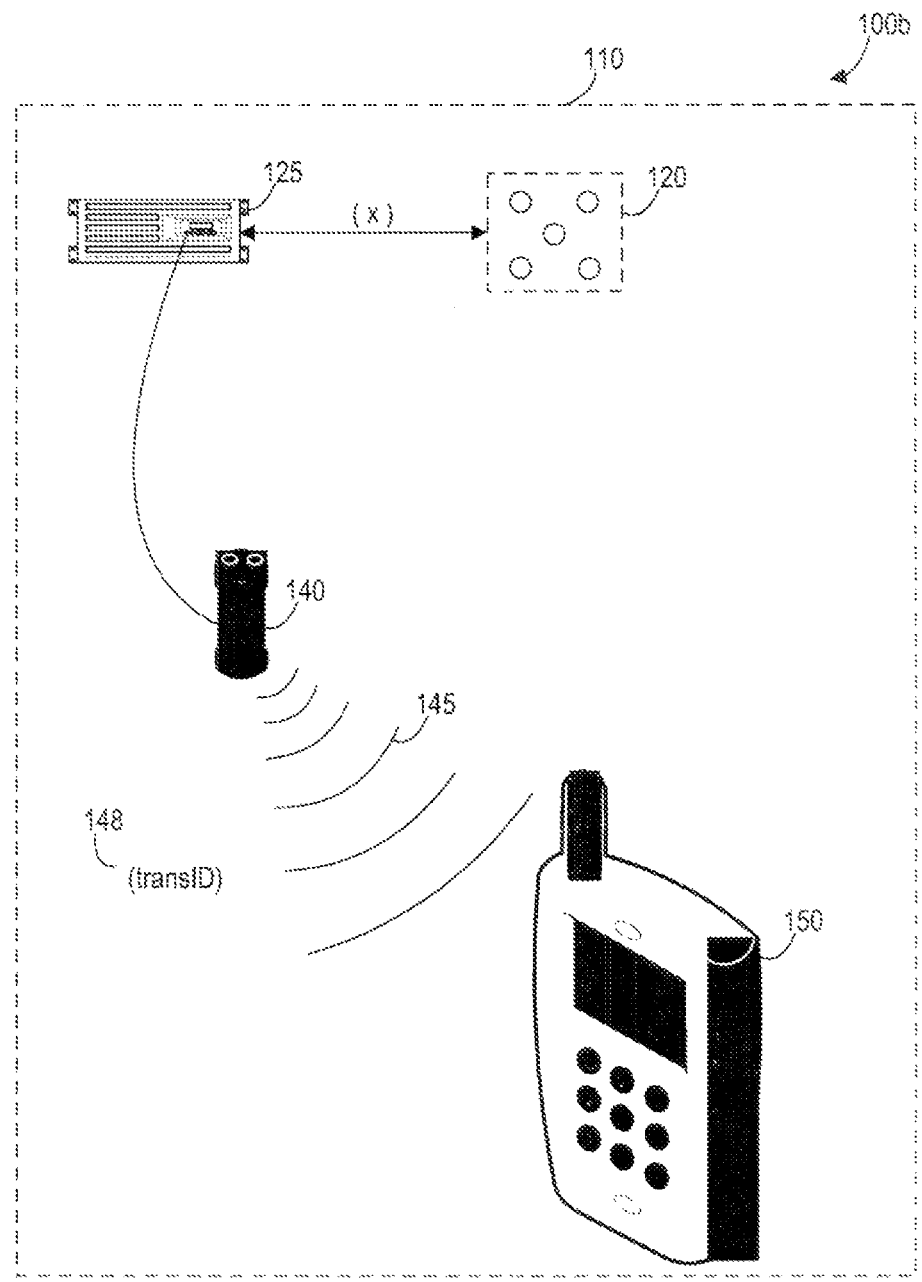
FIG. 1B is a system view of another embodiment of the present invention.

FIG. 1B illustrates a high level overview of an alternative preferred embodiment of the system 100b. The system 100b is similar to system 100a, except instead of using the OBD port 130 and OBD device 135, a suitable transmitter 140 is built onto the on-board computer 125 or otherwise is directly connected to the on-board computer 125. In this embodiment, the transmitter identifier (transID) may be used to identify the specific transmitter 140 or the vehicle 110 in which the transmitter 140 is installed. In yet a further embodiment (not shown), one or more of the sensors 120 (such as the speed or velocity sensor) may be adapted to include or communicate directly with its own transmitter without having to go through an on-board computer 125 (as may be desirable, for example, for use of this system with vehicles that do not have their own on board computer 125).

As stated previously, the system 100 described herein is capable of being used in alternate embodiments with any type of vehicle 110, even if it does not have an OBD interface or port 130—as long as the vehicle 110 or the on-board computer 125 of the vehicle has a component or other transmitter 140 capable of transmitting data 145 about the vehicle, including its state or status, to the mobile device 150 (or at least to a suitable receiver on the mobile device that is in communication with the system or control software application 160). Such capability may already be built into some vehicles at the factory during manufacture or may be added or installed separately as an add-on or post-manufacture component. Such devices or components may include data transmitters 140 built into or in communication with the on-board computer 125 or they could include mechanical sensors 120, such as a transmission speed sensor, that is able to provide speed data (v) in digital or analog format and that can be transmitted or otherwise provided to the mobile device 150 through wired or wireless communication 145. Additionally, as will be described herein, the above components enable an individual or institution/company to define, manage, and enforce an individual or institution/company mobile communication policy 170 regarding permitted or restricted usage of functions or capabilities 180 of the mobile device 150 while operating the vehicle 110. Such functions or capabilities 180 include the sending or receiving of various communications (e.g. text, phone, push to talk, email, Internet, and chat) or the launching of non-critical, non-business, or non-essential applications that are potentially distracting to the driver/operator of the vehicle (e.g., games, camera, etc.). Preferably, the system 100 allows emergency communications, administrator permitted communications, GPS, or other necessary or administrator-permitted services or applications capable from the mobile device 150. Such allowed functions are capable of being initiated when the vehicle is in motion or they are able to continue even if the vehicle starts into motion. Advantageously, centralized management of policies enables a company to define universal default policies that will be applied and enforced across the company with all employees so that policies do not have to be specified for each separate employee added to the system. Customized policies can then or can also be created for specific devices or vehicles, as desired.

As will be described hereinafter, the system 100 preferably includes a standard/default policy 170 configuration (for personal, government, or business applications) for ease of setup and immediate use. However, the system 100 also preferably enables the creation and implementation of customized policies to support more complex users and environments to meet the requirements of individuals, families, companies, or governments.

Basic Setup and Operation.

In preferred embodiments implemented in standard US automobiles built in or after 1996, having a standard OBD port 130 and conventional data available from on-board computers 125 accessible through the OBD port 130, the system 100 preferably uses standard OBDII Protocols, as will be appreciated and understood by those of ordinary skill in the art, to access specific operation information of the vehicle 110 in real time. Selected one or more of the standard OBD codes are advantageously usable herein, such as whether the vehicle is on or off, what gear the vehicle is in, what speed the vehicle is currently travelling, and the like; however, not all of the available or standard OBD codes are necessary for the primary functions of the system 100. However, as stated previously, the present system is also usable with other data interfaces that provide vehicle state or status information—now developed or adopted in the future. For example, the present system is also usable with other vehicle diagnostic protocols, such as OBD-I, OBD-1.5, EOBD (European On-Board Diagnostics), EOBD2 (enhanced version of EOBD), JOBD (Japanese On-Board Diagnostics), SAE J1939 (On-Board Diagnostic protocols used in the US for heavy duty trucks, commercial vehicles, and similar equipment), and any other similar diagnostic or communication protocols now in use or developed hereinafter that provide vehicle state or status information in accessible data format. But, for purposes of further discussion, use of OBD compliant data and devices will be referred to for convenience.

For standard use with the system 100a shown in FIG. 1A, the OBD device 135 is plugged into or otherwise connected into the standard OBD port 130 in a plug and socket configuration. Preferably, the OBD device 135 does not require an administrator or user to "turn on" or activate the OBD device 135. The OBD device 135 is preferably set to power itself on. The primary source of power for the OBD device 135 is derived from the conventional battery of the vehicle 110, which power is accessible through one of the connections in the standard OBD port 130. An alternative power source (not shown) is optionally usable by the OBD wireless interface device 135, such as through a separate connection to the vehicle's battery other than through the standard ODB connection 130 or, as a backup, by connection to a dedicated, external battery (or similar power source), not tied to the vehicle's battery.

The control software application 160 of the present system is preferably installed on the relevant mobile device or devices 150 that are to be controlled or monitored by the system 100. The system software or control application software 160 can be acquired via CD, file transfer over wireless communication, or via the Internet in conventional manner. The specific installation instructions are dependent on the specific mobile device on which the application 160 will be running. Information on the application interaction is described in greater detail hereinafter.

The application preferably installs with a "standard" default setup, where the "default" policy 170 includes the following typical functionality:

Preferably, emergency communication (911, etc. . . . ) are ALWAYS allowable. For safety and liability reasons, this preferably cannot be changed in any administrator-defined or configurable policy.

If the vehicle is not on and not moving, all mobile phone communications and functionality is allowed.

If the vehicle is on, but not moving (for at least a set period of time, such as 30 seconds), all mobile phone communications and functionality is allowed.

If the vehicle is on and moving (forward or reverse, regardless of speed), all mobile phone communications and functionality are disallowed.

If the vehicle is on, previously moving, but now stopped (but—stopped for less than 30 seconds), all mobile phone communications and functionality are disallowed.

Once the vehicle stops and is turned off, all mobile phone communications and functionality is allowed.

The system 100 also allows an administrator (or employer or parent) to create a more specific or customized policy 170 for a specific device, user, or groups/subgroups or employees or devices, as will be described in greater detail hereinafter. Such customization allows, for example, for a modifiable time period during which a vehicle must be stopped before communications and functionality is allowed, how fast a vehicle must be moving (e.g., minimum threshold speed or velocity) before functionality is disallowed, what phone numbers, emails, and/or people are permitted to communicate in (initially or to continue an already existing communication) to the mobile device 150 even when the vehicle 110 is moving, what numbers, entails, and/or people the mobile device 150 is permitted to communicate with (whether initiating or continuing an already existing communication) even when the vehicle is moving, what applications are allowed or not allowed when the vehicle is moving, what days and what times of days communications and functionality may be allowed or disallowed, and the like. Customized policies may be programmed within the system 100 using an interface provided by the control software application 160 directly on the mobile device or by using a remote web-enabled or web-accessed interface (illustrated by some of the exemplary screen shots herein) that allows for the creation of the policy and dissemination of the policy directly to one or more mobile devices under management by the relevant administrator.

Preferably, whenever a mobile device 150 is initially powered on and at periodic interval thereafter (such as every hour), the system software 160 will query a central server (not shown) associated with the system (or with a company or other entity using the system) and determine if there are any updates to the system software that need to be downloaded and installed. Additionally; any updates or changes to the policy associated with that mobile device (or user of that mobile device) will also be downloaded and installed. In this manner, it is easy and quick for updates or changes to be propagated within the system generally or to be propagated to employees, groups, or selected groups of people within a company or organization.

Preferably, the mobile device has a receiver and suitable software installed thereon that enables wireless communications, such as Bluetooth. Such Bluetooth connection may be paired directly between a specific mobile device 150 and the corresponding transmitter 140 or, in alternate embodiments described hereinafter, Bluetooth communications are used by the transmitter 140 to broadcast data transmissions 148 to any mobile devices 150 in Bluetooth range without a one-to-one pairing.

Figure 2:
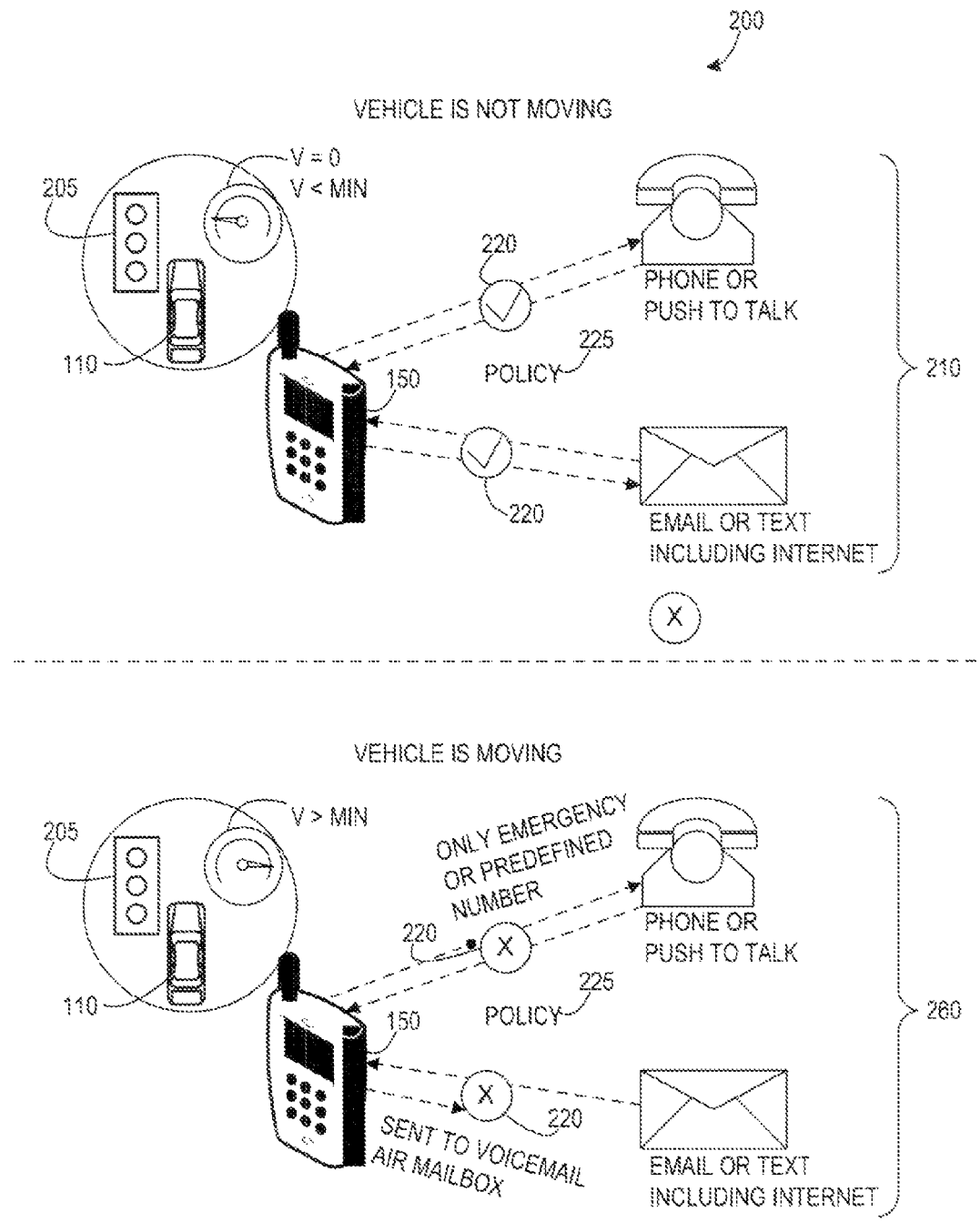
FIG. 2 is a high level overview of implementation of the system.

Turning now to FIG. 2, a high level overview 200 of the implementation of the system 100 based on use of a default policy 225 is disclosed. The first scenario 210 illustrates use of the default policy 225 when the vehicle 110 is parked or otherwise not moving, as shown by the vehicle gear 205 being in park or by the speed (v) of the vehicle being equal to zero (0) or less than the minimum threshold speed level set (for the minimum time requirement) by the policy 225. In this first scenario 210, the default policy 225 allows the mobile device 150 to make and receive phone calls, text messages, emails, Internet access, etc, as shown by check marks 220. The second scenario 260 illustrates use of the default policy 225 when the vehicle 110 is in gear and moving, as shown by the vehicle gear 205 being in a gear other than park and by the speed (v) of the vehicle is greater than the minimum threshold speed level set (or at least not below the minimum threshold speed for the minimum time requirement) by the policy 225. In this second scenario 260, the default policy 225 prevents the mobile device 150 from making or receiving phone calls, text messages, emails, Internet access, etc, as shown by blocked marks 270. As described above, emergency communications/phone numbers, permitted applications, or other "white listed" functions would still be permitted in this second scenario 260—for logical (e.g., business or safety) reasons.

Preferably, the system application 160 installed on the mobile device 150 is always running in the background and is transparent to the end user (i.e., the user of the mobile device). When the end user approaches a vehicle with an OBD wireless device 135 installed therein or with a suitable transmitter 140 built into or otherwise directly accessible to the on-board computer 125, a one-time authorized/initialization connection is made between the system application software 160 and the OBD wireless device 135 or suitable transmitter 140—now the system is ready to monitor and implement the default or customized policy 170 and to perform the actions defined for allowing or disallowing mobile communication or running of specified applications based upon data received from the vehicle on-board computer 125 and/or other sources of data regarding the status (on/off, in gear, in motion, etc.) of the vehicle 110. There is no required or additional action on the part of the end user, after initial installation of the system software 160 on the mobile device 150 to enable the system 100 and to initiate the protection and blocking or interference functions of the system software 160. As stated previously, whenever a mobile device 150 is initially powered on and at periodic interval thereafter (such as every hour), the system software 160 will query a central server (not shown) associated with the system (or with a company or other entity using the system) and determine if there are any updates to the system software 160 that need to be downloaded and installed. Additionally, any updates or changes to the policy 170 associated with that mobile device 150 (or user of that mobile device) will also be downloaded and installed. In this manner, it is easy and quick for updates or changes to the software 160 or policy 170 to be propagated within the system 100 generally or to be propagated to specific employees, groups, or selected groups of people within a company or organization.

In an alternate embodiment, the one-time initiation described above is not required by the firmware 160 installed on the mobile device 150. In this alternate embodiment, the firmware 160 allows for "one to many" connections between mobile devices 150 and Bluetooth enabled transmitters 140—whether installed as part of a OBD wireless device 135 or built into or otherwise directly accessible to the on-board computer 125. As will be appreciated by one of skill in the art, with conventional Bluetooth communication protocols, once a single mobile device 150 has "paired" and connected with a particular Bluetooth transmitter 140, other mobile devices are not able to connect with the Bluetooth transmitter 140 until the original mobile device disconnects and the pairing is dropped. Thus, with conventional Bluetooth connectivity, only one mobile device can be used in a vehicle at a time. That may be fine for some or many applications and uses, but not for all.

To address this challenge, in one embodiment, multiple mobile devices 150 can connect simultaneously to a single Bluetooth enabled transmitter 140 of the present system through the use of piconets. The Bluetooth enabled transmitter 140 acts as the "server" and is designated as the "master" device and each associated mobile device is designated as a "slave." However, to initiate the connection, the mobile device initiates the connection initially as the "master" device. Conventional Bluetooth protocols support a procedure called the master slave switch, which allows the mobile device to become the slave after initiating this initial connection. However, not all mobile devices, at least currently, are configured to enable master slave switching.

For this reason, in another preferred embodiment, the present system 100 does not use the "normal" or "orthodox" connection or paired oriented protocol for Bluetooth connections. Instead of initiating a connection in the normal Bluetooth sense using the mobile device 150, the transmitter 140 communicates its "state" information in a broadcast manner to any listening mobile devices 150 in Bluetooth range. It does this by changing its "friendly name" to represent the current state of the vehicle 110. This unorthodox use of Bluetooth enables the system 100 to support a much wider array of mobile devices 150 while also retaining the ability to block or control multiple mobile devices 150 in the same vehicle 110 using a single transmitter 140.

For example, in one simple embodiment, (1) on a predetermined or set interval (such as every second, or other predetermined period of time), the current speed, as well as other metrics of interest of the vehicle, are queried from the on-board computer 125; (2) once the speed data is obtained from the on-board computer 125, firmware installed on the on-board computer 125 or on the OBD device 135 receives the speed from the vehicle and causes the Bluetooth enabled transmitter 140 to change and transmit its device name to incorporate the current speed (or similar) information obtained from the onboard computer. For example, the device name may be initially defined as obdedge|-1| when the car is off; may be set as obdedge|0| when the car is on but not moving; or may be set as obdedge|55| if the car is traveling 55 MPH. The use of "obdedge" as the actual device name is arbitrary, and would typically be unique for each transmitter—the importance is the additional field information that is inserted into the transmitter name or ID (transID). This data is updated in real time on whatever predetermined period of time is desired and configured in the system 100, but preferably at intervals of no less than 3-5 seconds apart—at least while the vehicle is "on." As will be described hereinafter, it may be desirable, for battery and energy saving modes; to reduce transmission frequency (i.e., increase data transmission intervals) once a vehicle is off and confirmed off; (3) once the mobile device 150 identifies a Bluetooth enabled transmitter 140 of interest and in range (for example, determining that the Bluetooth enabled transmitter 140 belongs to the user of the mobile device 150 based on matching the device's Bluetooth Address or confirming that the transmitter ID is in an expected system configuration), the mobile device 150 then begins to request the current name of the Bluetooth enabled transmitter 140 at set intervals. After performing simple parsing techniques, the vehicle's real time speed can be extracted by the application 160 installed on the mobile device 150 from the current name information for the Bluetooth enabled transmitter 140, and then applied against the policy 170 on the mobile device 150 to make blocking and/or allowance decisions for features and functionality of the mobile device 150 based on the default or user's customized policy 170.

In another preferred and more sophisticated embodiment, if the vehicle 110 is "on" (i.e., its RPM>0), the Bluetooth friendly name of the transmitter 140 is updated on a periodic basis (e.g., every 3 seconds) to provide multiple pieces of data, such as vehicle state (on/off), current speed, max speed of the vehicle in the last predefined period of time (e.g., past 15 seconds), idle time information, VIN information, an incremental counter (used for detecting when a user has removed or disconnected an OBD device 135 or otherwise disabled the transmitter 140 or to identify when power has been lost to the OBD device 135 or transmitter 140—noted by a reset of the incremental counter). The amount of data and information that can be sent as part of the transmitter's Bluetooth "friendly name" depends upon the software and hardware used. For example, some transmitters 140 have a 16 character limitation in regards to how long the "friendly name" or transmitter ID (transID) can be. Therefore, in such a case, it is not possible to send all potentially relevant vehicle state or status data in a single friendly name data transmission. In such a case, the information transmitted can be divided into frames. Obviously, the more characters that the transmitter is capable of using as its Bluetooth friendly name, the fewer frames and fewer cycles of name transmissions required to pass on all relevant data to the listening mobile device. For purposes of the following discussion, we assume a 16 character limitation.

Frames:

Every frame starts with a predefined set of character used within the system and which enables the system to identify compliant transmitters. For discussion purposes for this embodiment, we will use the characters "celcon" to designate a transmitter 140 compliant with the system 100. Once the software 160 on the mobile device 150 determines that the transmitter 140 is compliant with the system 100, the software 160 on the mobile device 150 then compares the transmitter's Mac address with the policy 170 on the mobile device 150 to determine if the system is permitted to make blocking or interruption decisions based on data transmissions received from the transmitter 140. If so, the software 1.60 on the mobile device enters into a loop to constantly refresh the transmitter's "friendly name."

In this example, the 7th character in the device name is used as a "frame identifier."

- If the frame character is an "I": this means that the communication is in "initialization mode." The vehicle is currently off and ECU (engine control unit) or on-board computer is not responding to requests. During this frame the next 4 characters are ignored so should be set to 0's.
- If the frame character is an "0": this means that this frame contains the first 4 characters of the VIN number of the vehicle. These four VIN numbers will be the following 4 characters of the name.
- If the frame character is an "1": this means that this frame contains the second or next 4 characters of the VIN number of the vehicle. These four YIN numbers will be the following 4 characters of the name.
- If the frame character is an "2": this means that this frame contains the third or next 4 characters of the VIN number of the vehicle. These four VIN numbers will be the following 4 characters of the name.
- If the frame character is an "3": this means that this frame contains the fourth or next 4 characters of the VIN number of the vehicle. These four VIN numbers will be the following 4 characters of the name.
- If the frame character is an "4": this means that this frame contains the last digit of the VIN number of the vehicle. The next character is an S and the final two characters will contain the maximum speed encountered in the previous 15 seconds—with speed represented in hexadecimal format.
- If the frame character is a "V": this means that the vehicle does not support VIN information. The next character will be 0 and is ignored. The next character is an S and the final two characters will contain the maximum speed encountered in the previous 15 seconds—with speed represented in hexadecimal format.
- If the frame character is an "L": this is the "Idle Time Frame". The next 4 characters will contain a base 62 digit (0123456789abcdefghijklmnopqrstuvwxyzABCDEFGHIJKL MNOPQRSTUVWXYZ) representing 10 minute accumulations of idle time. For instance, if the first digit was a 3, that would mean in the last 24 hours recorded, the vehicle had 30 minutes of idle time. If the second digit is a 5, that would mean the 24 hour period before the last one had 50 minutes of idle time, etc. This 62 digit number would represent a total of the past 4 days worth of idle time the vehicle saw. Idle time is calculated based on when speed=0, but rpm>0.

The remaining characters (12-16) of the name are standardized and every frame displays it. Characters 12 and 13 represent the vehicles current speed in hexadecimal format. Characters 14-16 contain an incremental counter. If the device can not be removed, then the incremental counter does not need to be used and these characters can be set to 0's. Otherwise, the incremental counter can be used to determine if there has been a disconnect or power interruption, which would apparent if the counter reset to zero after having been incrementing previously.

Depending on the vehicle's state, not all frames need to be cycled through.

Vehicle States:

The OBD device or associated transmitter has 3 primary states that it can be in:

State 1: The car is off and ECU is not responding. In this state, only 2 frames are shown. Frame "1" and Frame "L". The device should cycle between these 2 frames every time the transmitter name is updated. In this state, the device name is only updated once every 15 seconds unless the state changes.

State 2: The car is off but the ECU is responding. In this state, the device is able to determine VIN information so the following frames are cycled through Frames "0" through "4"—if the vehicle has a VIN; otherwise, Frame "V" is transmitted. The "L" frame is also cycled through. Because of the extra frames shown, the device name (transID) is updated every 3 seconds. Because the car is off, the speed should be set to "FF" in every frame, which alerts the system software installed on the mobile device that the vehicle is still off.

State 3: The car is on. Here the device name is updated every 3 seconds and the following frames are cycled through: Frame "0" through "4" if the vehicle has a VIN, otherwise Frame "V". The "L" frame is also cycled through.

Getting Information from Vehicle:

When the vehicle is in State 1, the OBD device attempts to initialize the ECU every 10 seconds to see if the vehicle has come on. If the battery voltage of the vehicle drops below 12.4, the OBD device should stop querying the ECU until voltage rises above 12.4 again. Once the ECU responds, the OBD device should move into State 2 or State 3.

In State 2 and State 3, the OBD device should query the ECU every second for RPM and Speed information. RPM=0 means that the vehicle is "off" and RPM>0 means that the vehicle is "on."

Policy [Definition—Parameters]

The system 100 allows for the centralized management and enforcement Of a mobile communications policy 170 for one or more of a plurality of users or selectable groups or subgroups of users. The policy 170 addresses the various methods of communication (phone call, text message, email message, Internet, computer usage, push-to-talk, etc.) that a mobile device 150 can provide and, in some embodiments, which applications and functions on the device 150 are permitted to be initiated or continued when the vehicle is in motion. Preferably, the system 100 has a pre-defined (default) set of policies (rules) that are applied to the mobile device 150 during installation, that are included in the software 160 installed on the mobile device, or that are uploaded (or uploadable upon request) from the vehicle's on-board computer 125. A system administrator has the ability to re-define or apply a different customized policy that controls inbound or outbound communication and other functionality when the vehicle 110 is in motion or not for the driver or additional vehicle occupants.

Figure 3:
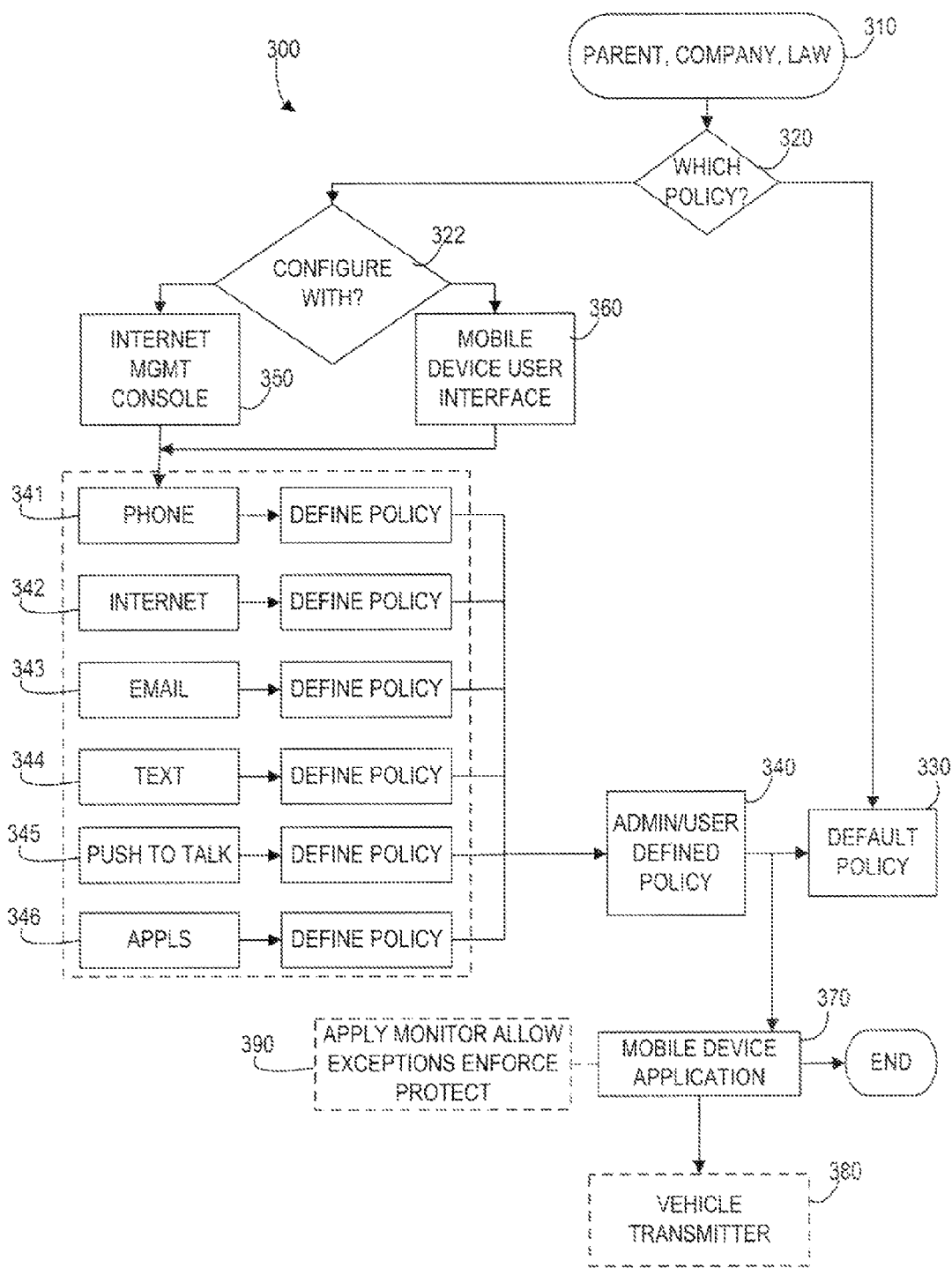
FIG. 3 is a flowchart of the processes for implementing policies of the present invention.

As shown in FIG. 3, a system administrator 310 (such as a parent or a company or division administrator, etc.) selects (step 320) whether a default policy or customized policy 340 will be applied to a specific user or mobile device. Preferably, a standard default policy is installed on or uploaded to each mobile device during initial software installation, so no "affirmative" action need to be taken by the system administrator to have the default policy in place and in effect once the software on the mobile device is installed and operational. If the policy is going to be customized, the system administrator has the option (step 322) of defining and configuring the customized policy using an Internet management console or interface 350 (described in greater detail hereinafter) or provided through the system software interface 360 built into and accessible directly on the mobile device (also described in greater detail hereinafter). As shown, the customized policy 340 is configured to have sub-policies or components defined for each of the major functions and capabilities of the mobile device, such as incoming and outgoing phone calls 341, Internet access 342, incoming and outgoing emails 343, incoming and outgoing text messages 344, push to talk capabilities 345, and other software applications 346 (such as maps, games, business software, address book, video or audio entertainment, etc.). Very precise customization is possible and desirable. Once the default policy is chosen or the customized policy is configured, it is made available to and accessible by the system application 370, by being installed or uploaded, typically, into memory on the mobile device itself. The system software 370 is then able to receive vehicular information from the vehicle transmitter 380 (once paired or otherwise in communication/broadcast mode) and the rules and exceptions 390 from the policy are consulted and used by the system software 370 to make real time decisions on whether to allow or block specific functionality based on the policy and the data received from the vehicular transmitter.

When using the remote Internet management console 350, the ability to define and provide multiple policies to multiple individuals can be implemented in real time, as long as the mobile device is accessible to the Internet or mobile data network. As stated previously, whenever a mobile device 150 is initially powered on and at periodic interval thereafter (such as every hour), the system software 160 will query a central server associated with the system (or with a company or other entity using the system) and determine if there are any updates to the system software that need to be downloaded and installed. Additionally, any updates or changes to the policy associated with that mobile device (or user of that mobile device) will also be downloaded and installed. In this manner, it is easy and quick for updates or changes to be propagated within the system generally or to be propagated to employees, groups, or selected groups of people within a company or organization.

Primary Application:

The system software application 160 may be written in a wide variety of programming languages now known or hereinafter developed, depending upon the mobile device platform. Currently, Java and C are two such exemplary programming languages. The application 160 has the ability to be configured and have the administrator-customized communication policy 170 either defined via the mobile device user interface or via the remote Internet management console, as shown in the exemplary screen shots attached hereto. The administrator-defined policy 170 determines how the mobile device 150 will handle incoming and outgoing communications (phone, text, push-to-talk, email, Internet, chat, etc. . . . ) and, in some embodiments, what applications installed or native to the mobile device 150 will be allowed to operate or run (whether initiated or, if already in progress, whether to remain operational). The application, installed and running actively in the background of the mobile device, checks for a connection between the mobile device and the wireless OBD interface installed on the vehicle, which is configured to access the OBD vehicle computer on a regular and consistent basis. If a legitimate and authorized connection is detected, the system application on the mobile device monitors and enforces communication policy; which may be based on the speed of the vehicle, the location of the vehicle, whether the vehicle is "on," what gear the vehicle is in, what day of the week, what time of the day, and the like. A conventional wireless OBDII interface may be used in the system; however, some of the system features and functions may not work or work as well as the customized ODB interface described herein.

Figure 4:
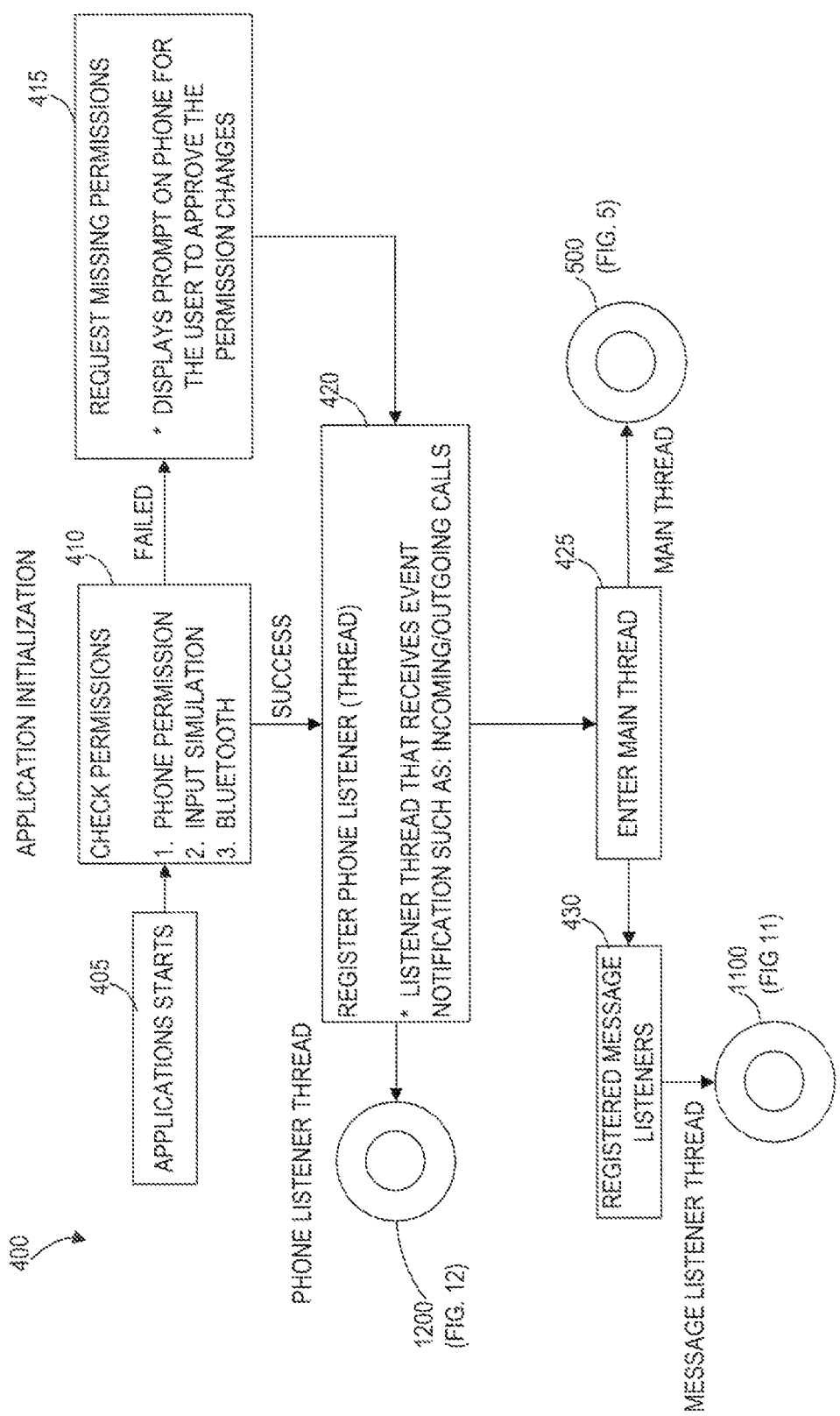
FIGS. 4-12 are flowcharts of various processes used by system software of the present to invention.

Turning now to FIGS. 4-12, various processes of the system software application 160 are described in association with the embodiment in which the mobile device pairs with the relevant transmitter FIG. 4 illustrates application initialization process 400. When the application initially starts (step 405), permissions are then checked (step 410). Such permissions include phone permissions, input simulation permissions, and Bluetooth permissions, if applicable to the particular mobile device. If any of the permissions fail, then any such missing permissions are requested (step 415), which preferably displays a prompt on the user's mobile device to approve any permission changes. If the permissions are successful (or once they are successful), the register phone listener (thread) is initiated (step 420). Phone listener thread 1200 is described in greater detail in association with FIG. 12. Main thread process is also initiated (step 425). Main thread process 500 is described in greater detail in association with FIG. 5.

Figure 5:
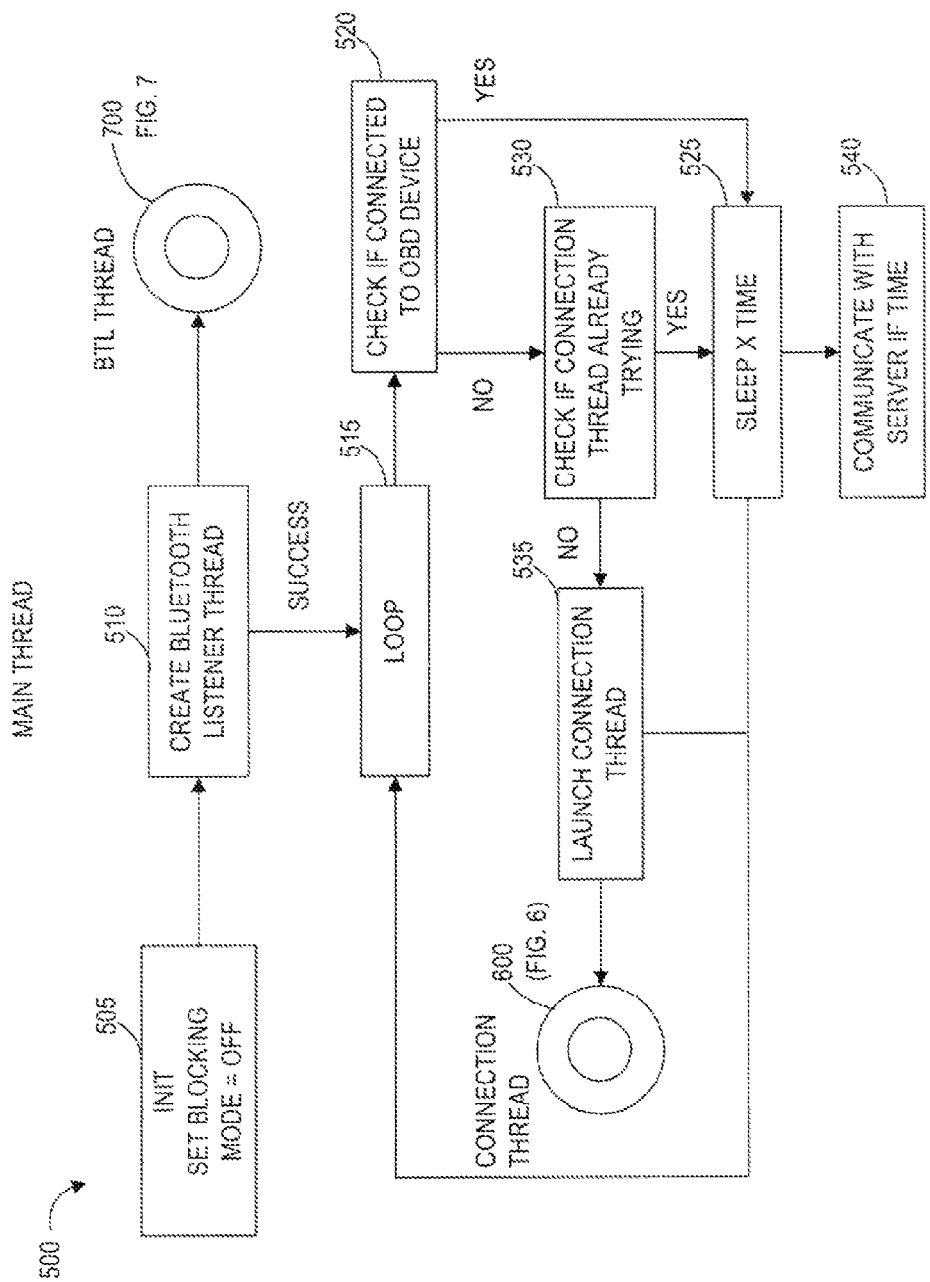

FIG. 5 illustrates main thread process 500. Main thread process initiates (step 505) and blocking mode is set to "off" Bluetooth listening thread is then created (step 510). Bluetooth listener thread 700 is described in greater detail in association with FIG. 7. Loop (step 515) then runs continuously while the application is running. The process checks (step 520) to see if the mobile device is connected to an OBD device. If yes, then the application "sleeps" (step 525) for a predetermined period of time (x). The application communicates (step 540) with the system server if a connection can be made and if there is sufficient time. Such connection enables data from the device to be transmitted to the administrator, if desired, and also enables updates to the software application to be uploaded, if necessary. If the mobile device is not connected to an OBD device, as determined at step 520, then the application checks (step 530) to see if a connection thread is already trying. If yes, then the application "sleeps" (step 525) for a predetermined period of time (x). If no, then a connection thread is launched (step). Connection thread 600 is described in greater detail in association with FIG. 6.

Figure 6:
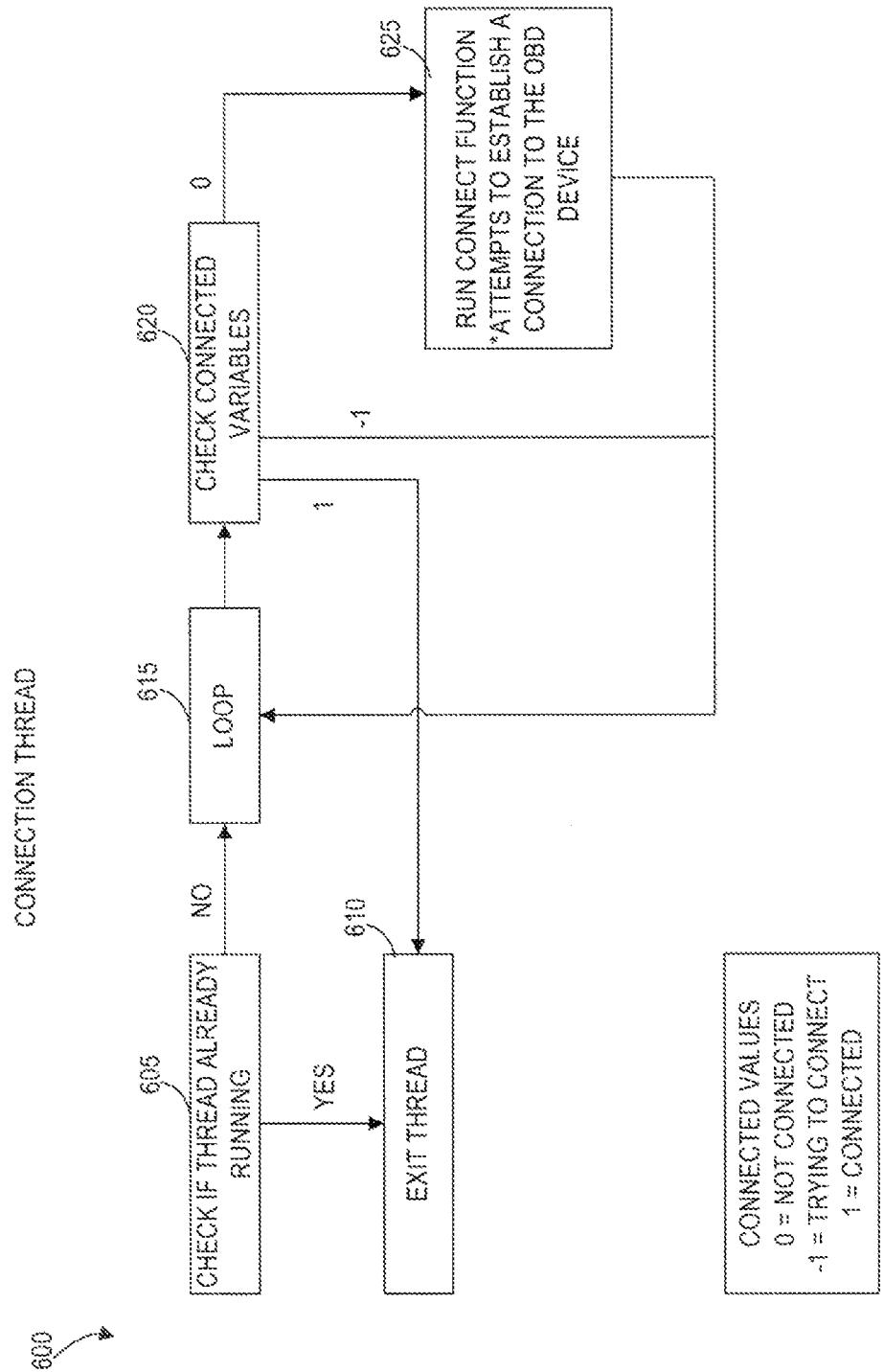

FIG. 6 illustrates connection thread process 600. Connection thread process 600 first checks (step 605) to see if the connection thread is already running. If so, then the connection thread process is exited (step 610). If not, then connection thread process starts a loop (step 615) and checks connected variables (step 620). A value of "1" indicates that a connection is made and the connection thread process is exited (step 610). A value of "−1" indicates that a connection is still trying to be made and the connection thread process continues to loop (step 615). A value of 0 indicates no connection, and a run connect function (step 625) is launched to attempt to establish a connection to the OBD device.

Figure 7:
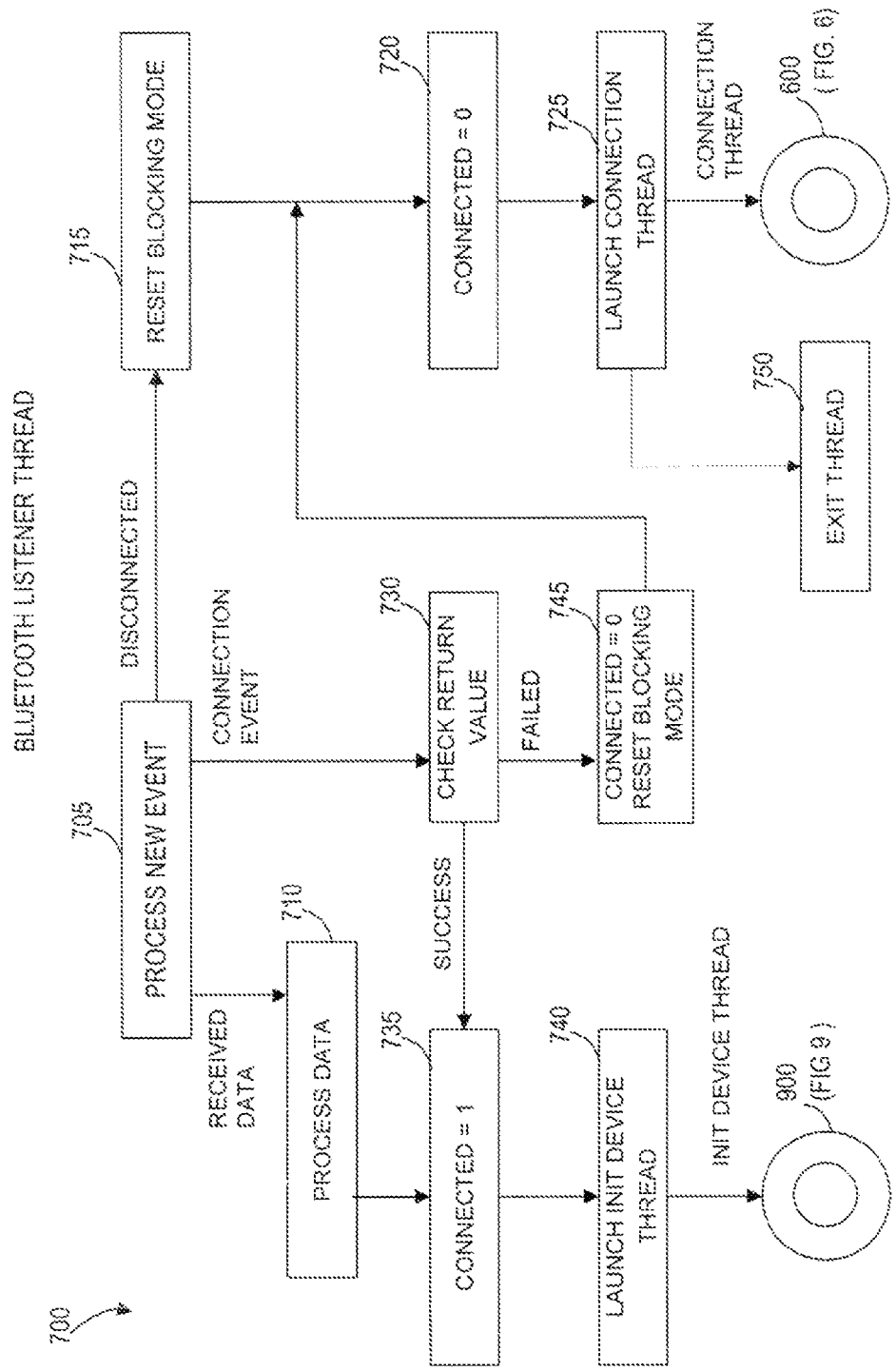

FIG. 7 illustrates Bluetooth listener thread process 700. Bluetooth listener thread process 700 first processes a new event (step 705). If data is being received, that data is processed (step 710). If the Bluetooth connection is disconnected, blocking mode is reset (step 715) to allow all communications and mobile device functionality. The connected value is set back to "0" (step 720), and connection thread is launched (step 725), then the Bluetooth listener thread process is exited (step 750). If there is a connection event associated with the processing of a new event (at step 705), then the application checks for a return value (step 730). If the return value fails, the blocking mode is reset to allow all communications and mobile device functionality and connected value is set back to "0" (step 745), connection thread is launched (step 725), then the Bluetooth listener thread process is exited (step 750). If the return value succeeds, the connected value is set to "1" (step 735) and the initialize device thread is launched (step 740). The initialize device thread 900 is described in greater detail in association with FIG. 9.

Figure 8:
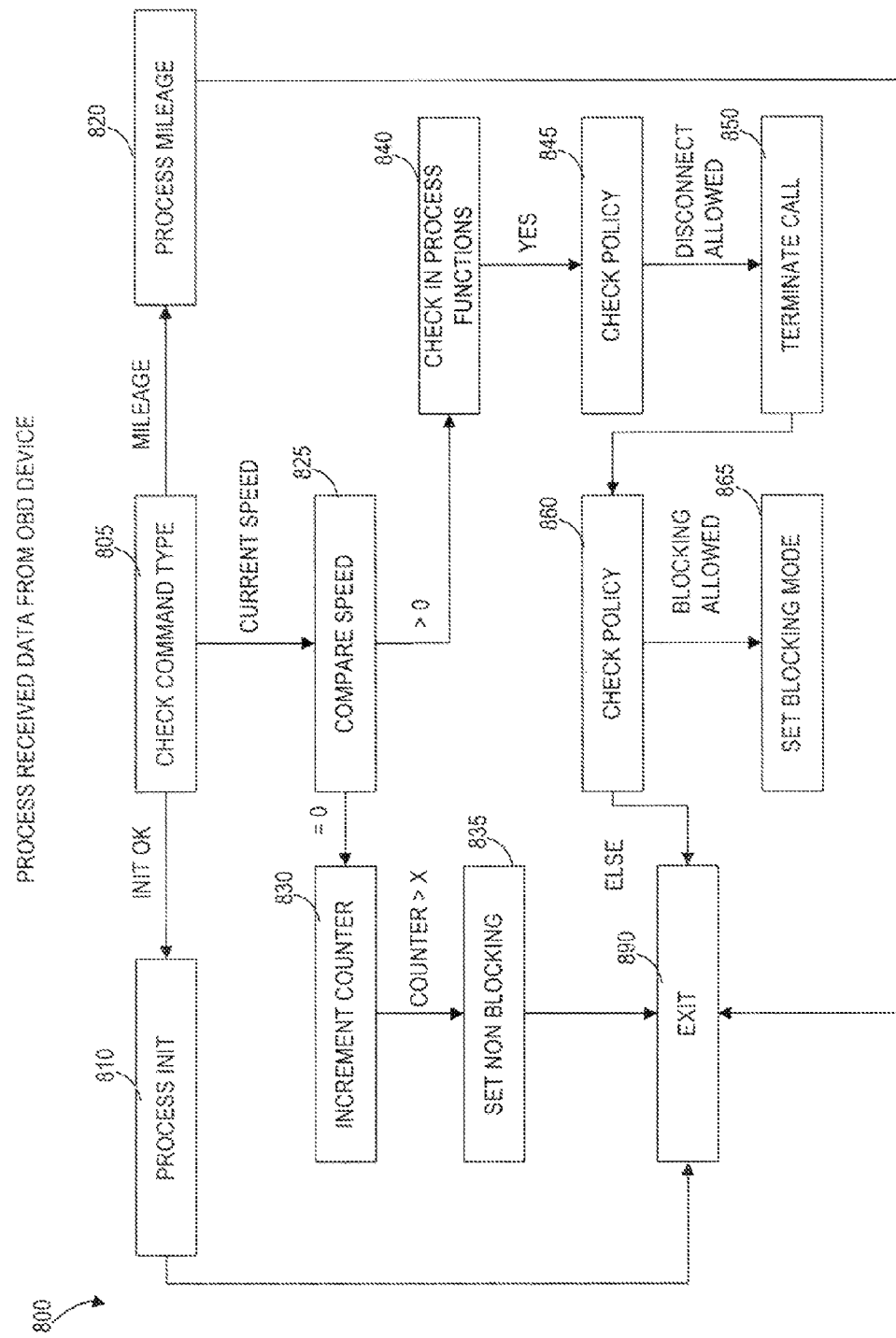

FIG. 8 illustrates Process Received Data from OBD Device thread 800. Process Received Data from OBD Device thread 800 first checks the command type (step 805). If initialization is OK, then the process initializes (step 810) and then exits (step 890). If mileage data is provided, the mileage data is processed (step 820) and then the process exits (step 890). If current speed data is provided, the process analyzes the speed (step 825) to determine if the speed of the vehicle is above or below a set threshold (shown as 0 in this example). If the speed is below the threshold, a counter is incremented (step 830), the application is set into non-blocking mode (step 890), and the process exits (step 890). If the speed is above the threshold, the process determines (step 840) what mobile device functions are currently "in process." The policy is checked (step 845) All functions that are not allowed by the policy are terminated, paused, or interrupted (step 850). Next, the policy is applied (step 860) and blocking mode is implemented for all functions not allowed while the vehicle is in motion above the threshold value (step 865). The process then exits (step 890).

Figure 9:
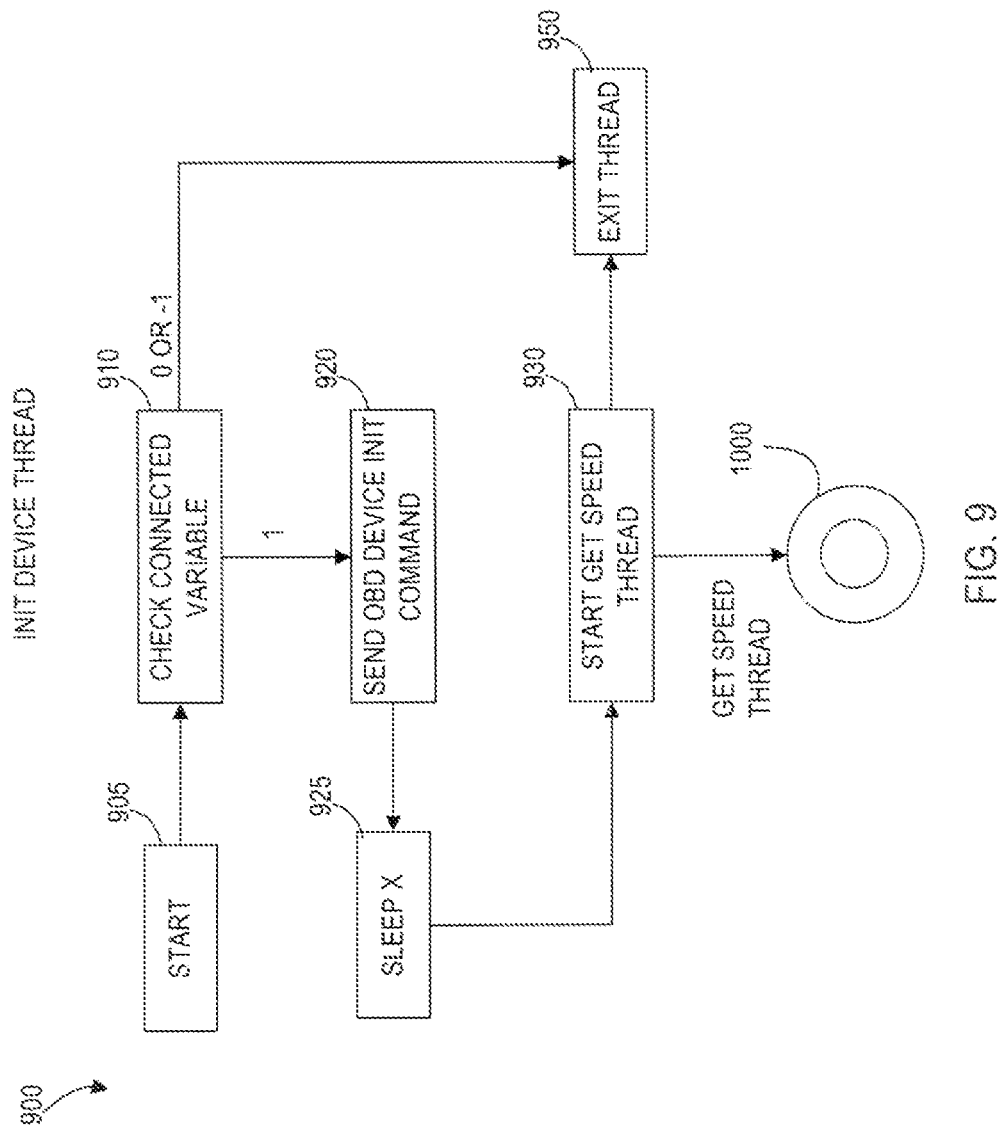

FIG. 9 illustrates the Initialize Device Thread process 900. The Initialize Device Thread process 900 starts (step 905) and the connected variable is first checked (step 910). If the connected variable value is "1" the OBD Device Initialization command is then sent (step 920), the process "sleeps" for a predetermined period of time (step 925), then the get speed thread process 1000 is launched (step 930). The get speed thread 1000 is described in greater detail in FIG. 10. The process then exits (step 950). If the connected variable value is "1" or "0", then the process merely exits (step 950).

Figure 10:
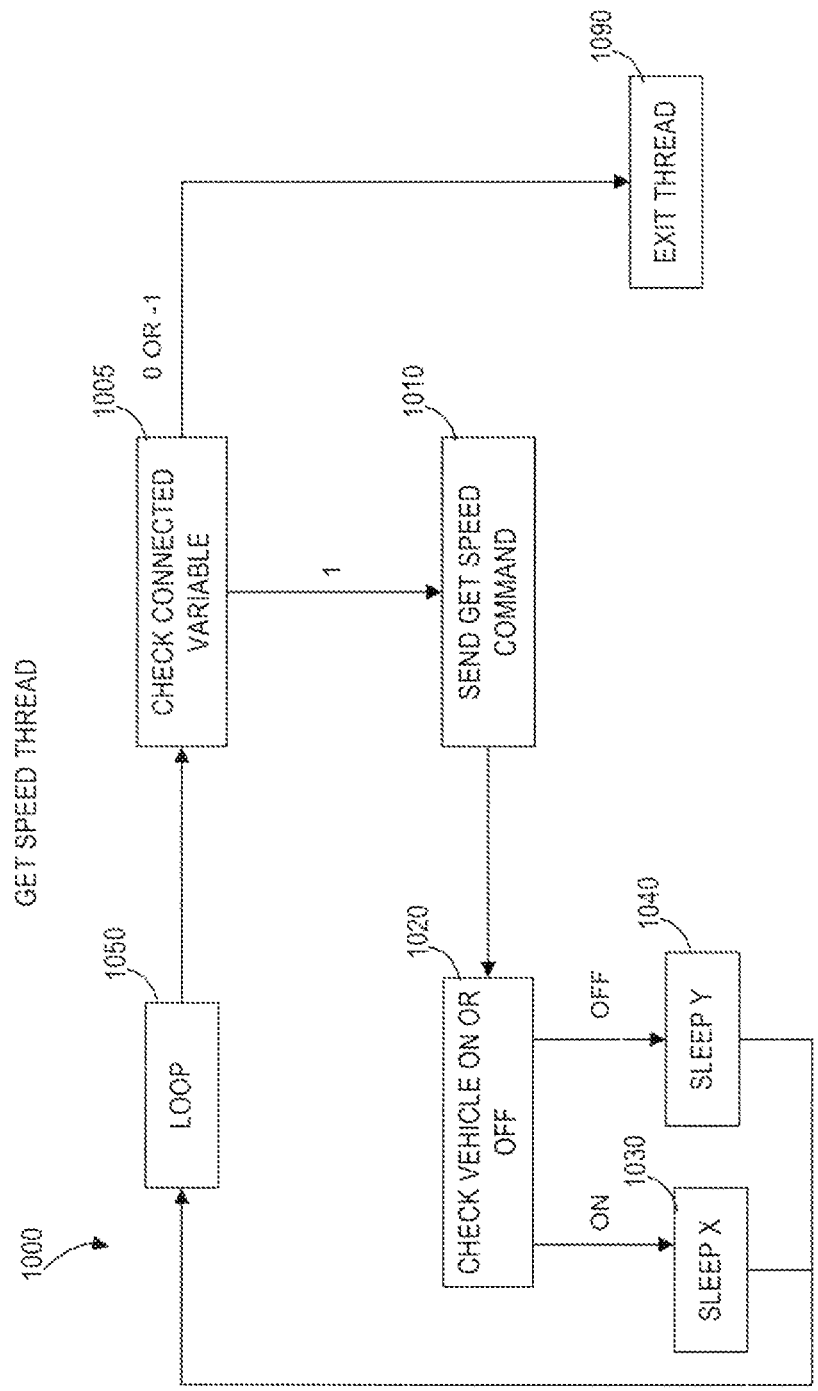

FIG. 10 illustrates the get speed thread process 1000. The get speed thread process 1000 first check for the connected variable (step 1005). If the connected variable value is "−1" or "0", then the process merely exits (step 1090). If the connected variable value is "1", then the process sends (step 1010) a get speed command. The process then determines (step 1020) if the vehicle is on or off. If the vehicle is "on", the process sleeps for a predetermined period of time X (step 1030). If the vehicle is "off", the process sleeps for a predetermined period of time Y (step 1040), which is longer than predetermined period of time X. The process then loops (step 1050) repeatedly.

Figure 11:
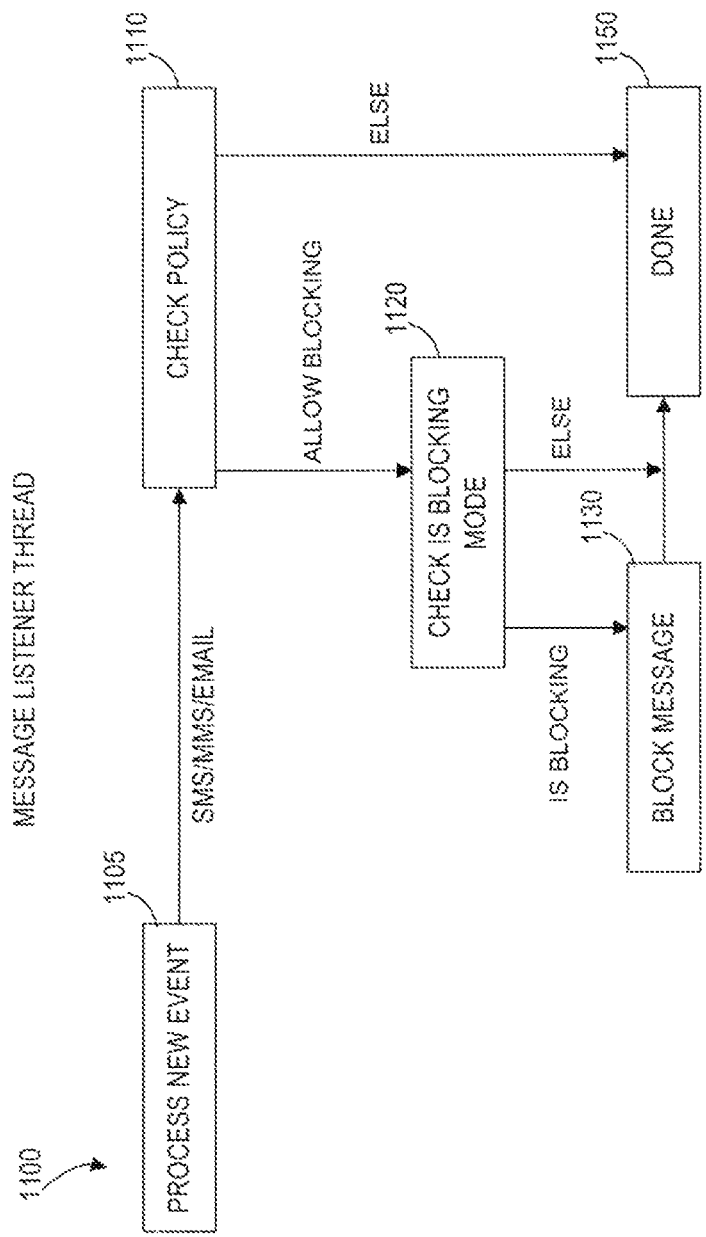

FIG. 11 illustrates message listener thread process 1100. Message listener thread process 1100 first processes a new event (step 1105). If there is an incoming text (sms/mms) or email, the policy is checked (step 1110). The process determines if the system is in blocking mode and if the message sender or recipient is on the white list (step 1120). If the system is in blocking mode and if the message sender or recipient is not on the white list, the message or email is blocked (step 1130). Otherwise, the process ends (step 1150).

Figure 12:
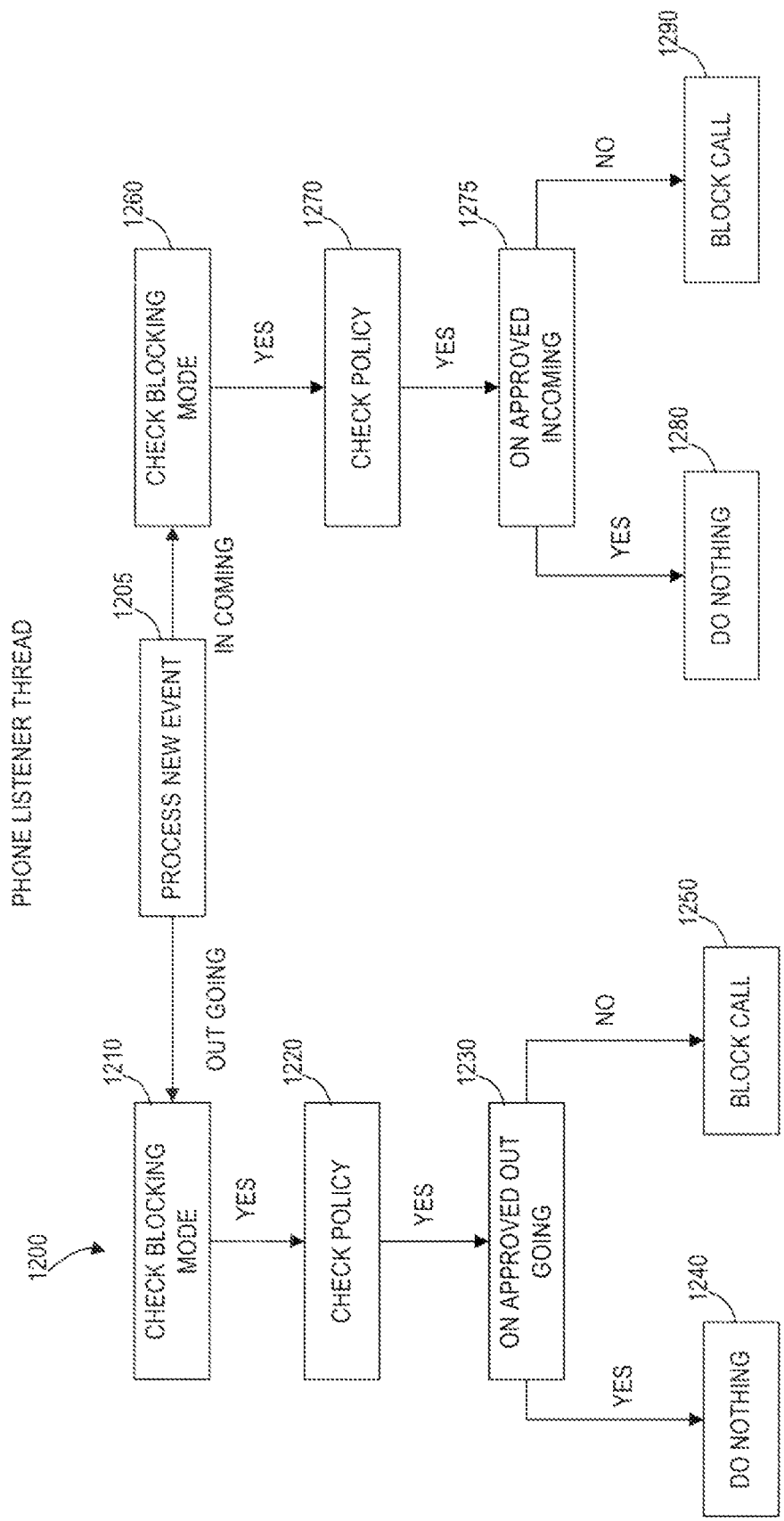

FIG. 12 illustrates phone listener thread process 1200. Phone listener thread process 1200 first processes a new event (step 1205). If there is an outgoing call, the process determines if the system is in blocking mode (step 1210) and then checks the policy (step 1220). The system determines (step 1230) if the call recipient is on the white list or otherwise approved. If so, then the outgoing call is permitted to continue without interruption (step 1240). If not, then the outgoing call is blocked (step 1250). If there is an incoming call, the process determines if the system is in blocking mode (step 1260) and then checks the policy (step 1270). The system determines (step 1275) if the call originator is on the white list or otherwise approved. If so, then the incoming call is permitted to continue without interruption (step 1280). If not, then the incoming call is blocked, terminated, routed to an automated response, routed to voicemail or similar handling (step 1290).

Figure 20:
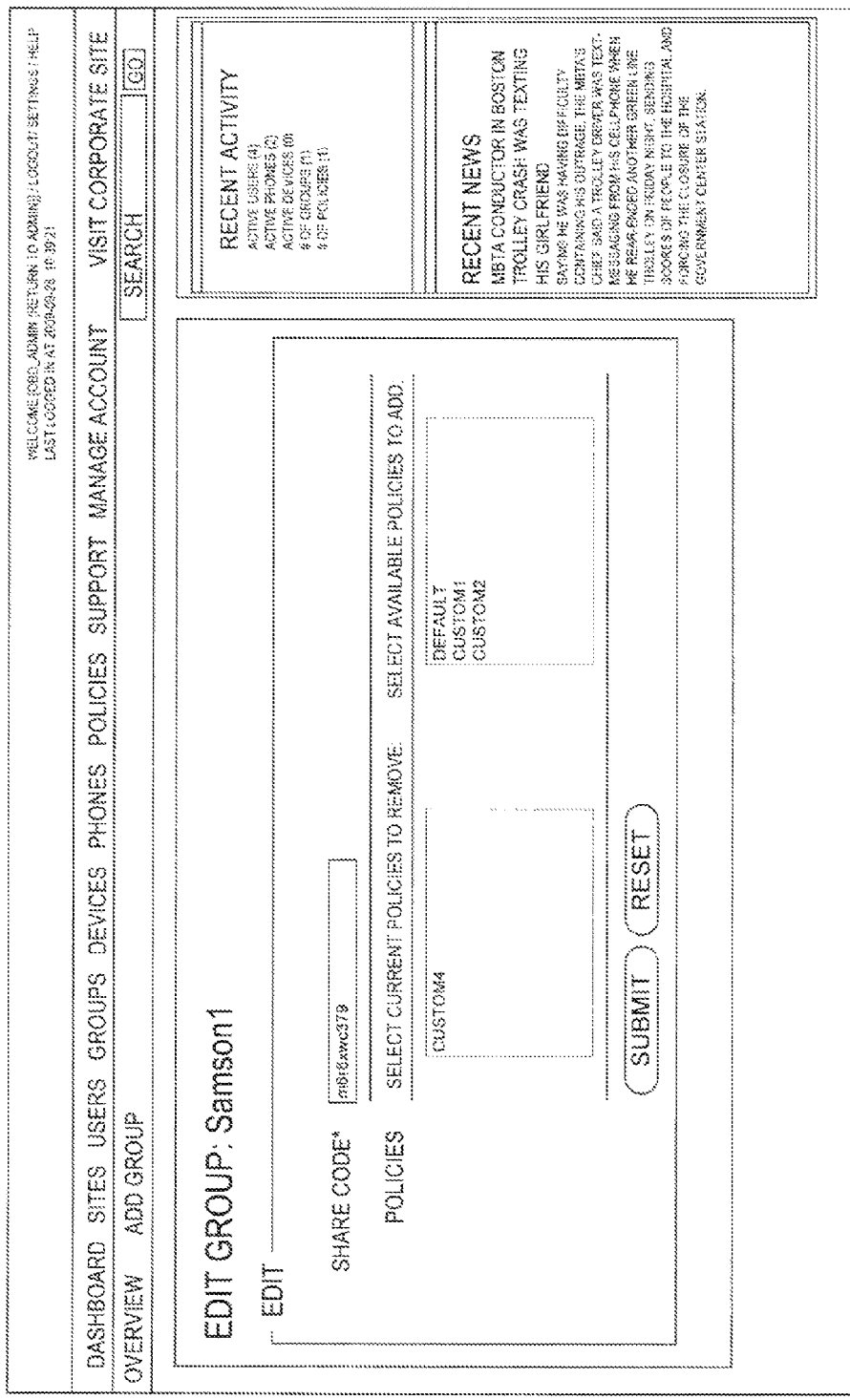

FIGS. 13-32 illustrate exemplary screen shots of the Internet management console or interface 350 as may be used in the present system. FIG. 13 illustrates a customer activation screen shot. FIG. 14 illustrates a typical login page for access to the Internet management console. FIG. 15 illustrates a main dashboard page, from which an administrator is able to access other key functions and pages within the management console, including creating, accessing, and editing: (a) site information, (b) user information, (c) group information, (d) devices information, (e) policies, and (f) support. FIG. 16 illustrates a manage my numbers interface that enables an administrator to add or delete specific phone numbers for a specific user from the allowed or white list of numbers that would not be blocked even when the user's vehicle is in motion. FIG. 17 illustrates a main policy configuration interface for configuring a single policy and includes check boxes for selecting or deselecting: (i) block phone calls; (ii) block text messages; (iii) block emails; (iv) allowed overrides per day; (v) allowed personal numbers; (vi) email address for receipt of notices of policy overrides or breaches; (vii) approval for sending of text messages associated with notices of policy overrides or breaches; (viii) defining of text to display on the screen of the mobile device during blocking of functionality; and similar customization. FIG. 18 illustrates a standard user information settings interface. FIG. 19 illustrates a groups management page that allows an administrator to define a group and set the policy or policies that will apply to that group. FIG. 20 illustrates an edit page that enables an administrator to modify, add, or delete policies that apply to a particular group. FIG. 21 illustrates a main groups management and search page that allows an administrator to review the list of groups under management and to select one or more for review or access. FIG. 22 illustrates a centralized phone management interface. FIG. 23 illustrates a policy management page that enables an administrator to define and create a new, customized policy. FIG. 24 illustrates a policy edit and further configuration interface. FIG. 25 illustrates a main policies management and search page that allows an administrator to review the list of policies created and used by the administrator and to select one or more for review or access. FIG. 26 illustrates an allowed phone numbers list for inclusion on a group policy. FIG. 27 illustrates a site management interface page that enables an administrator to manage sites under current management. FIG. 28 illustrates a site creation interface page that enables an administrator to create and identify sites under current management. FIG. 29 illustrates a user management interface that enables an administrator to view and edit information about specific users. FIG. 30 illustrates a user creation interface that enables an administrator to create and define a new user in the system. FIG. 31 illustrates an edit page that enables an administrator to configure the policy for a specific user. FIG. 32 illustrates an edit page that enables an administrator to configure the allowed phone numbers associated with a specific user.

Policy Implementation for Mobile Devices that Have Texting Capabilities but No Data Plan For mobile devices that do not have Internet access and only have texting capability (as opposed to a data plan), once the system application or firmware is installed on the mobile device, policy parameters and status or reporting information can be communicated between the main system or central server and the mobile device using traditional texting—with header information that is picked up by the firmware. Policy variables and parameters are passed in known order or in determinable format so that the firmware can implement the policy or any changes in policy that are made at any point in time. Likewise, the firmware makes use of the texting function built onto the mobile device to enable information and data to be passed back to the system or central server as needed.

For those few mobile devices that have neither texting or data plans, policies need to be installed at time of install of the system software or upgrade or update of such system software.

OBD Interface:

The wireless OBD interface of the system is the preferred method of communication between the vehicle on-board computer and the system application or firmware installed on the mobile device if a suitable transmitter is not installed directly on the vehicle's on board computer. The OBD interface includes conventional and currently available functions and features of ODBII compliant interfaces, but preferably includes the following additional functions and features:

Engineered board and chipset with custom micro code to communicate with OBD compliant vehicle on-board computer protocols (i.e.: ISO, CAN, etc. . . . ) and mobile device to application;

On-board data storage for analysis, policy enforcement, troubleshooting, reliability and recovery;

Self-contained backup battery power supply for situations when vehicle provided power is absent, thus ensuring continued analysis, policy enforcement, troubleshooting, reliability and recovery; and Unique identification assigned to each system wireless OBD interface in addition to the unique identification generated by Bluetooth. This is to facilitate:

unique tracking capabilities related to the operation of the system (e.g., proprietary wireless OBD interface assigned to a specific VIN number or series of VIN numbers);

portability between multiple OBD vehicles;

audit capability by capturing and storing information with a unique identifier(s) and time stamp; and support As stated previously, however, the system described herein is capable of being used in alternate embodiments with any type of vehicle, even if such vehicle does not have an OBD interface or port (or if the system does not need to use the OBD port)—as long as the vehicle or the on-board computer of the vehicle has a component or other device capable of transmitting data about the vehicle or status of the vehicle to the mobile device. Such capability may already be built into some vehicles or may need to be added or installed separately. Such capabilities may be implemented entirely by hardware or they may include a combination of hardware and software. Such devices or components may also include data transmitters built into or in communication with the on-board computer or they could include mechanical sensors, such as a transmission speed sensor, that is able to provide speed data in digital or analog format and that provide data that can be transmitted or otherwise provided to the mobile device through wired or wireless communication.

Application Uses:

A first practical or business use of the system described herein is the ability to provide, implement, and enforce a rules-based mobile communications policy for the driver/operator of the vehicle or even additional passengers. The application rules are pre-defined (default)—or set by the administrator(s) associated with the end users. The system accurately detects the forward/reverse movement of a vehicle, based preferably on data provided by the on board computer of the vehicle, and refers to policy (end user/vehicle) as to allow or disallow various methods of communication (e.g., phone, text, push-to-talk, email, Internet, chat) or operation of particular applications or other functionality of the mobile device. For example, if vehicle is running but not moving, policy default may be to allow all forms of communication and any applications. However, once forward/reverse movement (of any speed) is detected, the policy default is to prevent any "non-emergency" or "non-pre-approved" communications or applications. Movement includes situations in which a vehicle is actually moving in forward or reverse direction or in which the vehicle has stopped temporarily due to traffic congestion, stop sign, or red light. In a preferred embodiment, the default policy is to allow for communication or use of an application after 30 seconds of vehicle non-movement. Should the vehicle move at a detectable rate, the communication and application will be disallowed or disconnected. Once the vehicle stops again, a new 30 second timer starts to run. If the vehicle is turned off and ceases to run, the default policy is to allow immediate communications, both outbound and inbound, and use of all applications. Movement detection based on data provided by conventional on board computers is highly accurate. Preferably, a "default" detectable or actionable speed is set to 1 mph; however, this value or level may be changed or set to a different default level or a different customized level by the administrator. Default policy is to allow emergency communications; administrator permitted communication, GPS, and any other necessary mobile device services or applications.

Preferably, if the mobile device user is engaged in active communication or use of a non-permitted application and enters a system-enabled vehicle and starts the engine, the default policy permits such communication or application to continue until forward or reverse movement, above the threshold level, is detected. Once the vehicle is detected to be moving above the threshold level, the communication or application will be disallowed, discontinued, or stopped, per the "default" policy. Again, the policy or rules may be customized by the administrator for specific business or personal needs.

Additional Applications and Uses of System

1. Parent-Teen (New Driver) Network: The web enabled management console also allows for a individual end user to notify and distribute the application to other interested parties so that they may add their mobile device to the protection of the system. An example of this is presented in appendix 6. Example—A parent has enabled the system on their child's vehicle. They access the management console and begin the process of additional participant notification. They simply add in the email addresses and names of their child's friend's parents and send them a message explaining the program and inviting them to participate. They are provided a link to download the application for their child's phone or other mobile device if the wish. Upon doing so, they can apply the default installation policy along with their added emergency number. Now the system (once keyed) will recognize the mobile device when in proximity and will begin to monitor and enforce communications inbound and outbound if the vehicle is moving. Stated differently, an administrator (parent, individual, group, etc. . . . ) has the ability to craft, distribute, and manage invitations to download the mobile device firmware application to allow for policy enforcement when riding in a proprietary wireless OBDII Interface vehicle. The web-enabled management console provides the administrator with a utility to produce an email from a template, send the email to a defined list of recipients, see who has opened and agreed or declined to participate, and allow continued management. The limited web-enabled management console for those that agree to participate provides limited functionality. After agreeing to a license agreement and remote policy agreement, the participant is able to define some basic policies related to emergency contact numbers. Participants can easily migrate this account to a fully protected account with the acquisition of a proprietary wireless OBDII Interface.

2. Fleet with non-assigned vehicles and many drivers: The system allows for the support of multiple drivers for multiple vehicles. The drivers and vehicles are activated and managed in the system. When a driver approaches and enters the vehicle the system connects via the unique Bluetooth connection and checks the database to see what policy is applicable.

3. Speed alerting: There are two methods of communicating the speed of the vehicle to the system and multiple methods for reporting and alerting the speed to the administrator and/or parent. The preferred method of communication of the speed from the vehicle to the device and solution is by using the unique Bluetooth connection method whereas the firmware delivers the speed embedded in the transmitter ID (transID) or "friendly name" of the broadcast. The second method of communication is via the standard Bluetooth connection and OBD communication. The reporting and alerting can be logged in the system. In addition the administrator and/or parent can set limits in the management console that will alert them via text, email or phone of the violation.

4. After hours alerting: Another instance that can be monitored is the use of a vehicle after hours or after a pre-defined time by the administrator and/or parent. When the vehicle is determined to be moving, the time is cross referenced with the policy to determine if a violation has occurred. If so, the administrator and/or parent can define policy protocols in the management console that will alert them via text, email or phone of the violation.

5. Vehicle optimization and performance reporting: The system enables and allow the real time or near real time reporting of vehicle diagnostic information back to the system server. Because the mobile device is in communication with the on-board computer of the vehicle and because any associated mobile devices have communications set up with the system server, the present system enables the real time or near real time reporting of vehicle diagnostic information to identify problems or potential problems with the vehicle or engine of the vehicle before a "check engine" light or alarm is triggered and before or without having to take the vehicle into a service center for routine connection of the on-board computer to a service computer through the OBD interface.

6. Integration with Fleet management solutions: Since much relevant data about the vehicle and about usage of mobile devices by the driver/operator of the vehicle are available within the system, the system enables companies to monitor and control behavior by its employees who use company-owned vehicles or mobile devices. Speed, driving patterns, and mobile device usage can be monitored to ensure that employees adhere to required or permitted driving patterns. Such monitoring enables companies to reduce their risk and liabilities and encourages/rewards good driving behaviors—particularly for companies and organizations that require or use employees that spend much or all of their time for the employer as a driver/operator of a vehicle.

7. Monitoring of Idle Time of a Vehicle: As stated previously, much relevant data about a vehicle is available to the system and can be captured and communicated through one or more mobile devices associated with the respective vehicle back to a central management system. For example, since the system detects and monitors both when a vehicle is "on" and when the vehicle is in motion beyond the threshold minimum—in order to implement the communication blocking policy on the mobile device, it follows that the system is also able to identify when the vehicle is "on" but not moving—in other words, when a vehicle is in "idle" status. Since this analysis of vehicle motion is taken on a frequent and periodic basis, the amount of idle time associated with a particular vehicle can be determined. Such "idle status" data can be collected by the mobile device and forwarded back to the central control on a predetermined frequency. For example, such data may be transmitted every hour, every day, or when a threshold idle time has been exceeded within a set period of time.

In addition, since the speed data is collected in real time and on a continuous basis, it is possible to distinguish a vehicle that is moving slowly or periodically in traffic or one that is merely sitting in a parked or stopped position for non-traffic reasons.

Depending upon the space available for data transmission and other factors, such as communication bandwidth and battery life, etc., the idle time may be transmitted by the mobile device as the exact number of minutes of idle time in the predefined period of time. Alternatively, to reduce bandwidth, the data transmitted for idle time may represent a larger chunk of time. For example, each unit of data transmitted could equal 1 minute of idle time or each unit of data could represent a larger chunk of idle time, such as a ten minute increment.

Why is this important? With unleaded gasoline running between $2.00 and $4.00 per gallon in the United States and much more in other countries, and idle running of the motor of a vehicle costing anywhere from ⅓ to 2 gallons or more per hour of idling, excessive idling can be a difficult to detect loss of gas mileage for the vehicle and extra fuel cost for running the vehicle. Although idle time and cost of operation for a single vehicle may not be significant in and of itself, it is easy to see how a company with a large fleet of vehicles, in which just 10-20% of such vehicles are engaged in unnecessary or abusive idling, can greatly increase the operating costs for the entire fleet.

With such data captured and forwarded to the central management control, reports can be generated to show the company which vehicles in its fleet are left running, in idle position, excessively, abusively, or unnecessarily. Having this data enables a company with a large fleet to identify and change behavior of specific drivers and also gives the company greater control in reducing fuel charges for its fleet of vehicles. Reports can be generated on any desired basis or frequency (daily, weekly, monthly, etc.

In a preferred embodiment, anytime a vehicle is "on" but not moving, the system starts incrementing the minutes. Every 24 hours, the system adds up all the idle time minutes that occurred in the last 24 hour period (24 hours is just used for exemplary purposes; any other time frame can be specified or chosen). The system then sets a data field in the mobile device communication packet to that value associated with the amount of idle time. To compress data usage, the idle time value can be divided by some divisor, such as a 10 or 15 minute block, so that each idle time unit actually represents a 10 or 15 minute block. Preferably, the prior 3 to 5 (preferably 4) days worth of idle time is sent in one or more communications from the mobile device back to the central control for recordation and synchronization purposes with the database servers at central control. This enables data to be collected (without interruption) even for vehicles that are not used for several days at a time. Once the system tallies all the idle time from the past 24 hours, it is then added to the frame of data being sent. Preferably, the idle time from a current 24 hour segment is not sent until the end of the relevant 24 hour period. Once that data is "finalized," then its added to the 3-5 (preferably 4) days of idle time data that are being sent.

To illustrate further, a frame of data (described earlier) sent to the mobile device could look like the following: celconL3781ff031. In this frame, L is merely and arbitrarily used to represent that this is an idle time frame, then the following characters: 3, 7, 8, and 1 represent the past 4 groups of idle time data. So, if the system were using 24 hour blocks for a "group," and if each unit of idle time value equaled 10 minutes of idle time, then that would mean that yesterday, the respective vehicle had 30 minutes of idle time; the day before, it had 70 minutes of idle time, the day before that had 80 minutes, and four days ago the idle time was 10 minutes.

Idle time is calculated based on when speed=0, but rpm>0.

8. Reporting to Insurance companies: Since much relevant data about the vehicle and about usage of mobile devices by the driver/operator of the vehicle are available within the system, the system enables insurance policies to be developed and customized to encourage particular behaviors and to discourage or punish, by means of higher premiums or exclusions for coverage, other behaviors.

Safety Assurance:

The system is preferably configured to allow immediate and direct communication with a emergency contact/number (e.g., 911, 411, 991, 112, ICE, etc. . . . ) or any administrator pre-approved number(s) (e.g., main office, supervisor, dispatch, etc. for business applications; parent, home, etc. for personal or family applications) if an emergency or trouble situation arises. The solution will not deny inbound or outbound communications that are considered to be an emergency regardless of the status of the vehicle. The administrator pre-defined or pre-approved number(s) are dependent upon the administrator's policies and settings.

Policy Enforcement:

The administrator-defined policy is enforced by the application installed on the mobile device. The application allows for emergency communications (e.g., to or from 911, 411, 991, 112, ICE, etc. . . . ) and other administrator-approved numbers and applications. The administrator-approved numbers may be defined as (i) allow in/allow out; (ii) allow in/disallow out; (iii) disallow in/allow out; and (iv) disallow in/disallow out. The communication is either allowed or disallowed by the application, which delivers a disconnect/no connect command for communications (or a close/pause command for applications) in the mobile device. The administrator is also able to specify operational hours and operational days for the policy that are independent of vehicle motion. For example, the system policy may be configured to block communications or applications only during weekday business hours Or only during night-time driving, and the like. Similarly, GPS functionality may be incorporated into the system to disallow communications or applications based on the location of the vehicle in a geographic location.

Policy Breaking Protection:

Policy enforcement is also performed by collecting and analyzing logging information for predefined triggers and/or anomalies detected against regular usage information. For example, the administrator may be notified in real time (using the communication capabilities of the mobile device itself) when detection of a break/breach in policy is detected/discovered. Alternatively, vehicle data and mobile device usage may be examined periodically by the administrator by accessing logged data stored on the mobile device and/or on the ODB interface device.

Disabling Protection:

To ensure policy protection and enforcement and to protect against disabling the mobile device application and/or the wireless OBD interface, internal controls have been engineered to detect and log the history and alert when a disabling incident takes place.

For example, the wireless OBD interface has memory added and constant power provided by the vehicle and/or an onboard/built-in battery power supply. When a user approaches an enabled vehicle, a connection is made and logged both on the mobile device and in memory on the wireless ODB interface. During normal operation, the system application on the mobile device is configured to communicate periodically with a remote Internet management console to provide user history and usage statistics. The secure remote Internet management console regularly analyzes this information for anomalies. If a user disables the wireless OBD interface, the log will reflect this action, and discovered by the ongoing analysis and make notification to the administrator. Also, as discussed above, the system application can also be configured to send a text message or otherwise send an "alert" to the administrator using the communication capabilities of the mobile device if an anomaly, error, or potential policy violation is detected by disabling the system application or OBD interface, or by attempting to circumvent the policy (e.g., by reprogramming or renaming an application or contact on the mobile device to try to make an unauthorized contact or application appear to be one of the approved ones).

In one embodiment, disabling protection is built in to detect when the user removes the wireless OBD interface from the connection to the vehicle on-board diagnostics connection. The preferred wireless OBD interface has memory added and backup battery power to log any disconnection event. The backup battery power enables the wireless OBD interface to establish or maintain communication with the mobile device even when power from the vehicle is unavailable or lost. Functionality has been built into the wireless OBD interface to detect the disconnection and then send a request to the mobile device to send an alert to the administrator. If the mobile device is unable to make an immediate notification, the alert is stored until a connection and delivery is possible and such alert is logged on the OBD interface until accessed by the administrator.

In another embodiment, disabling protection has been built in when the user attempts and successfully disables the mobile device application permissions (e.g., disabling Bluetooth, stop connecting, etc.). The system application monitors and checks for this activity. An alert can be sent to the administrator to notify when a permission/parameter has been changed or violated. Alternatively, the incremental counter information can be sent back to the administrator or centralized server, which would enable the administrator or server to identify a disconnection or power outage.

In another embodiment, to help with detecting the removal of an OBD device, in lieu of or in combination with an on-board power supply and memory on the OBD device which can store and report disconnection of the OBD device, firmware installed on the OBD device may be configured to include a variable, on a timer that increments that variable by 1 every minute or other predetermined period of time after the OBD device has been installed and plugged into the vehicle's OBD port. So, when the OBD device is first plugged in, the timer variable is set to zero (0), then after 10 minutes, for example, the variable has incremented to 10, and after 1 hour, the variable has incremented to 60, etc. After 1 month, the variable is around 40,300. Each time the mobile device connects with the OBD device, the timer variable is obtained by the mobile device and sent to the main system server. The server will store that timer variable and if that variable every starts over or is a lower value than a prior saved value, the system will know that the OBD device has been disconnected. Preferably, the variable is maintained in volatile memory on the OBD device and will maintain and increment its value as long as the OBD device remains connected to the OBD port of the vehicle and as long as the battery of the vehicle does not lose power. If the OBD device is disconnected or if the vehicle battery loses all power, the timer variable will reset back to zero. At some point the timer variable may get too big and will naturally roll back over to zero. However, the server knows what the maximum value is for the timer variable and can determine when the variable resets back to zero on a normal rollover event.

Permission Enabled Use on Device with Application Running:

Policy can be enabled by the administrator to enable permission-based use/communication with a PIN provided by the administrator. In this embodiment, a vehicle operator can allow a passenger of the vehicle full use of a mobile device that has the application installed and enabled to be used upon entry of the authorized PIN. The PIN logs but allows a temporary override of administrator-defined policy enforcement and permits immediate device communication and use of applications. To prevent abuse of this feature, the administrator can apply a policy to restrict the number of permission-enabled uses within a defined time frame.

Other Functionality:

The system is configurable to support multiple users and multiple wireless OBD interfaces. This supports a business application for managing a fleet of vehicles assigned to one or many individuals. The Bluetooth master slave designation described above allows and enables this multiple mobile devices with one or more OBD devices—where there are multiple drivers and mobile devices associated with one or more vehicles and corresponding OBD devices.

Battery Savings Protocols

Battery saving modes may be used to reduce battery consumption required by firmware installed on the relevant mobile device. The below programming illustrates the values that may be used to control battery consumption in a basic manner.

Connection Attempt Delay is the amount of time in milliseconds between searching for nearby Bluetooth devices (i.e., OBD devices).

ConnectionAttemptDelaySmall is number of milliseconds between trying to connect to OBD devices found on the search.

SpeedAttemptDelay is the number of milliseconds between speed readings.

SpeedAttemptDelayOff is the number of milliseconds between trying to read speed when connected to a vehicle that is OFF.

obscureDelay is the number of milliseconds between writing the system screen on top of other applications when the mobile device is in "blocking" mode.

Low is the preferred, default setting, which uses the battery the fastest.

Max is the most conservative mode to preserve battery life.

Low Battery Mode: (Default):
   connectionAttemptDelay=20000;
   connectionAttemptDelaySmall=3000;
   speedAttemptDelay=1000;
   speedAttemptDelayOff=15000;
   obscureDelay=500;

Medium Battery Mode:
   connectionAttemptDelay=25000;
   connectionAttemptDelaySmall=5000;
   speedAttemptDelay=2000;
   speedAttemptDelay2=2000;
   speedAttetnptDelayOff=20000;
   obscureDelay=1000;

High Battery Mode:
   connectionAttemptDelay=35000;
   connectionAttemptDelaySmall=7000;
   speedAttemptDelay=3000;
   speedAttemptDelay2=2000;
   speedAttemptDelayOff=30000;
   obscureDelay=1500;

Max Battery Mode:
   connectionAttemptDelay=40000;

connectionAttemptDelaySmall=9000;
speedAttemptDelay=5000;
speedAttemptDelay2=2000;
speedAttemptDelayOff=40000;
obscureDelay=2000;

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof It should also be understood that the present invention also encompasses computer-readable medium having computer-executable instructions for performing methods of the present inventions, and computer networks and other systems that implement the methods of the present inventions.

We claim:

1. A system for controlling functionality of a mobile device when the mobile device is in a vehicle, wherein the vehicle includes an on-board computer that is configured to obtain speed data from the vehicle, comprising:
a transmitter in electronic communication with the on-board computer and configured to transmit an indication of the speed data on a periodic basis;
a receiver installed on the mobile device adapted to receive the indication of speed data transmissions from the transmitter;
a software application installed on the mobile device, wherein the software application runs in memory resident on the mobile device whenever the mobile device is powered on and wherein the software application receives the indication of speed data from the receiver, the software application including a rules-based policy associated therewith that defines when and which functions of the mobile device are disabled by the software application in response to the indication of speed data transmission; whereby, in response to receipt of the indication of speed transmission data, if the vehicle speed exceeds a minimum threshold speed level, the software application disables the functions of the mobile device in accordance with the rules-based policy associated therewith,
wherein the rules-based policy includes rules for one or more of the following: preventing outgoing calls from the mobile device, preventing the mobile device from accessing the phone functions on the mobile device, disabling the display of the mobile device, causing the software application to display a system screen on the mobile device when the vehicle speed exceeds the minimum threshold speed level, immediately interrupting and disabling the functions of the mobile device when the vehicle speed exceeds the minimum threshold speed level, rules specific to the vehicle, rules specific to the mobile device, rules that are only effective during predefined days of the week and hours of the day, rules that vary as a function of predefined days of the week and hours of the day, rules that vary based upon the GPS-determined location of the mobile device, defining a PIN or password that can be entered into the mobile device to enable all functions of the mobile device even if the vehicle is in motion, defining a PIN or password that can be entered into the mobile device to enable predefined functions of the mobile device even if the vehicle is in motion, preventing incoming calls from being received by the mobile device, allowing incoming calls to be received by the mobile device but preventing any indication of the incoming call from being detected by or notified to a user of the mobile device until a later period of time, routing incoming calls directly to voice mail, preventing incoming and outgoing text messages, disabling the mobile device completely, identifying specific numbers or contacts from which the mobile device can receive communications on an incoming basis even when the vehicle is in motion, identifying specific numbers or contacts to which the mobile device is permitted to communicate on an outgoing basis even when the vehicle is in motion, and identifying specific applications that are usable or launchable by the mobile device even when the vehicle is in motion.

2. The system of claim 1 wherein the functions of the mobile device remain disabled for a predetermined period of time, set according to the rules-based policy, even after the indication of speed transmission data indicates that the vehicle has stopped moving.

3. The system of claim 1 wherein the rules-based policy includes rules for one or more of the following functions of the mobile device: making an outgoing call, receiving an incoming call, sending or receiving a text message, text chatting, sending or receiving an email, Internet browsing, and launching of a specified application using the mobile device.

4. The system of claim 1 wherein the transmitter is built into and integrated with the on-board computer.

5. The system of claim 1 wherein the transmitter is included in an on-board diagnostic (OBD) device that plugs into the OBD port of the vehicle, wherein the OBD port is in electronic communication with the on-board computer.

6. The system of claim 1 wherein the transmitter and receiver communicate through a Bluetooth wireless communication protocol.

7. The system of claim 6 wherein the transmitter and receiver are paired using the Bluetooth protocol.

8. The system of claim 6 wherein the transmitter broadcasts the indication of speed data in at least one of the Bluetooth device data fields, which are visible to all Bluetooth receivers in range of the transmitter.

9. The system of claim 8 wherein one or more mobile devices are able to read and extract the indication of speed data and act simultaneously thereupon because there is no conventional Bluetooth pairing established between the transmitter and the respective receiver of the one or more mobile devices.

10. The system of claim 8 wherein the transmitter broadcasts the indication of speed data by embedding the indication of speed data in its Bluetooth device name.

11. The system of claim 8 wherein the transmitter broadcasts additional data by embedding the additional data in its Bluetooth device name.

12. The system of claim 1 wherein the software application has a default rules-based policy that is associated with the software application when the software application is installed on the mobile device.

13. The system of claim 1 wherein the rules-based policy is customizable by an account administrator and is distributed to a selectable plurality of mobile devices.

14. The system of claim 1 wherein the indication of speed data is included as a variable in the device name transmitted by the transmitter.

15. The system of claim 1 wherein the rules-based policy is updated on the mobile device by means of a text message sent to the mobile device.

16. The system of claim 1 wherein the rules-based policy is updated on the mobile device when the mobile device is connected to the Internet.

17. The system of claim 1 wherein the rules-based policy is distributed and enforced on the mobile device without acceptance or interaction by a user of the mobile device.

18. The system of claim 1 wherein the software application installed and running on the mobile device automatically activates the Bluetooth functionality of the mobile device and prevents the Bluetooth functionality from being turned off or disabled by a user of the mobile device.

19. A system for controlling functionality of a mobile device when the mobile device is in a vehicle, wherein the vehicle includes an on-board computer that is configured to obtain state data about the vehicle, comprising:
a Bluetooth transmitter in electronic communication with the on-board computer, the transmitter periodically embedding an indication of the vehicle's state obtained from the on-board computer into one or more of the transmitter's Bluetooth configuration parameters;
a Bluetooth receiver associated with the mobile device, wherein the receiver reads one or more of the transmitter's Bluetooth configuration parameters and extracts the indication of the vehicle's state therefrom but without establishing a Bluetooth pairing with the transmitter; and
executable software code operating within the mobile device whenever the mobile device is powered on and wherein the executable software code receives the indication of the vehicle's state from the receiver, the executable software code accessing a rules-based policy associated therewith, whereby, in response to receipt of the indication of the vehicle's state, the executable software code disables functionality of the mobile device in accordance with the rules-based policy,
wherein the rules-based policy defines when and which functions of the mobile device are disabled and wherein the rules-based policy addresses one or more of the following: prevents outgoing calls from the mobile device, prevents the mobile device from accessing phone functions on the mobile device, disables a display of the mobile device, causes a system screen to be displayed, immediately interrupts and disables the functions of the mobile device, is associated with the vehicle, is associated with the mobile device, is only effective during predefined days of the week and hours of the day, has a plurality of rules that vary as a function of predefined days of the week and hours of the day, includes a plurality of rules that vary based upon the GPS-determined location of the mobile device, defines a PIN or password that can be entered into the mobile device to enable all functions of the mobile device, defines a PIN or password that can be entered into the mobile device to enable predefined functions of the mobile device, prevents incoming calls from being received by the mobile device, allows incoming calls to be received by the mobile device, prevents any indication of the incoming call from being detected by or notified to a user of the mobile device until a later period of time, routes incoming calls directly to voice mail, prevents incoming and outgoing text messages, disables the mobile device completely, identifies specific numbers or contacts from which the mobile device can receive communications on an incoming basis, identifies specific numbers or contacts to which the mobile device is permitted to communicate on an outgoing basis, and identifies specific applications that are usable or launchable by the mobile device regardless of the vehicle's state.

20. The system of claim 19 wherein the rules-based policy includes rules for one or more of the following functions of the mobile device: making an outgoing call, receiving an incoming call, sending or receiving a text message, text chatting, sending or receiving an email, Internet browsing, and launching of a specified software application using the mobile device.

21. The system of claim 19 wherein the transmitter is built into and integrated with the on-board computer.

22. The system of claim 19 wherein the transmitter is included in an on-board diagnostic (OBD) device that plugs into the OBD port of the vehicle, wherein the OBD port is in electronic communication with the on-board computer.

23. The system of claim 19 wherein one or more mobile devices are able to receive and act simultaneously upon the transmitter broadcast because there is no conventional Bluetooth pairing between the transmitter and the receivers of the one or more mobile devices.

24. The system of claim 19 wherein the transmitter's Bluetooth configuration parameters include a data field for the transmitter's device name and wherein the indication of the vehicle's state is embedded in the data field for the transmitter's device name.

25. The system of claim 19 wherein the transmitter's Bluetooth configuration parameters include data fields for the transmitter's Bluetooth friendly name, supported services, and device class.

26. The system of claim 19 wherein the state data about the vehicle includes one or more of the following: speed, vehicle engine state, engine rpm, vehicle identification number, miles driven, idle time, braking events, acceleration events, and engine diagnostics.

27. The system of claim 19 wherein the rules-based policy is customizable by an account administrator and is distributed to a selectable plurality of mobile devices.

28. The system of claim 19 wherein the rules-based policy is updated on the mobile device by means of a text message sent to the mobile device.

29. The system of claim 19 wherein the rules-based policy is updated on the mobile device when the mobile device is connected to the Internet.

30. The system of claim 19 wherein the rules-based policy is distributed and enforced on the mobile device without acceptance or interaction by a user of the mobile device.

31. The system of claim 19 wherein the executable software code operating on the mobile device automatically activates the Bluetooth functionality of the mobile device and prevents the Bluetooth functionality from being turned off or disabled by a user of the mobile device.

32. A system for controlling functionality of a mobile device when the mobile device is in a vehicle, wherein the vehicle includes an on-board computer that monitors a current state of the vehicle, comprising:
 a Bluetooth transmitter in electronic communication with the on-board computer, the transmitter periodically embedding an indication of the current vehicle state obtained from the on-board computer into at least one of the Bluetooth device data fields, the Bluetooth device data fields being visible to all Bluetooth receivers in range of the transmitter;
 a Bluetooth receiver associated with the mobile device, wherein, when in range of the transmitter, the receiver reads at least one of the Bluetooth device data fields and extracts the indication of the current vehicle state without establishing a Bluetooth pairing with the transmitter; and
 executable software code operating within the mobile device whenever the mobile device is powered on, wherein the executable software code receives the indication of current vehicle state extracted by the receiver and disables one or more functions of the mobile device in accordance with a rule-based policy based on the indication of current vehicle state;
 wherein the rules-based policy defines when and which functions of the mobile device are disabled and wherein the rules-based policy addresses one or more of the following: prevents outgoing calls from the mobile device, prevents the mobile device from accessing the phone functions on the mobile device, disables the display of the mobile device, causes the software application to display a system screen on the mobile device, immediately interrupts and disables the functions of the mobile device, is associated with the vehicle, is associated with the mobile device, is only effective during predefined days of the week and hours of the day, has a plurality of rules that vary as a function of predefined days of the week and hours of the day, includes a plurality of rules that vary based upon the GPS-determined location of the mobile device, defines a PIN or password that can be entered into the mobile device to enable all functions of the mobile device, defines a PIN or password that can be entered into the mobile device to enable predefined functions of the mobile device, prevents incoming calls from being received by the mobile device, allows incoming calls to be received by the mobile device, prevents any indication of the incoming call from being detected by or notified to a user of the mobile device until a later period of time, routes incoming calls directly to voice mail, prevents incoming and outgoing text messages, disables the mobile device completely, identifies specific numbers or contacts from which the mobile device can receive communications on an incoming basis, identifies specific numbers or contacts to which the mobile device is permitted to communicate on an outgoing basis, and identifies specific applications that are usable or launchable by the mobile device regardless of the vehicle's current state.

33. The system of claim 32 wherein the rules-based policy includes rules for one or more of the following functions of the mobile device: making an outgoing call, receiving an incoming call, sending or receiving a text message, text chatting, sending or receiving an email, Internet browsing, and launching of a specified software application using the mobile device.

34. The system of claim 32 wherein the Bluetooth transmitter is built into and integrated with the on-board computer.

35. The system of claim 32 wherein the transmitter is included in an on-board diagnostic (OBD) device that plugs into the OBD port of the vehicle, wherein the OBD port is in electronic communication with the on-board computer.

36. The system of claim 32 wherein one or more mobile devices are able to receive and act simultaneously upon the transmitter broadcast because there is no conventional Bluetooth pairing between the Bluetooth transmitter and the Bluetooth receivers of the one or more mobile devices.

37. The system of claim 32 wherein the transmitter's Bluetooth device data fields include data fields for the transmitter's Bluetooth friendly name, supported services, and device class.

38. The system of claim 32 wherein the state data about the vehicle includes one or more of the following: speed, vehicle engine state, engine rpm, vehicle identification number, miles driven, idle time, braking events, acceleration events, and engine diagnostics.

39. The system of claim 32 wherein the rules-based policy is customizable by an account administrator and is distributed to a selectable plurality of mobile devices.

40. The system of claim 32 wherein the rules-based policy is updated on the mobile device by means of a text message sent to the mobile device.

41. The system of claim 32 wherein the rules-based policy is updated on the mobile device when the mobile device is connected to the Internet.

42. The system of claim 32 wherein the rules-based policy is distributed and enforced on the mobile device without acceptance or interaction by a user of the mobile device.

43. The system of claim 32 wherein the executable software code operating on the mobile device automatically activates the Bluetooth functionality of the mobile device and prevents the Bluetooth functionality from being turned off or disabled by a user of the mobile device.

* * * * *